United States Patent
Koike et al.

(10) Patent No.: US 10,564,477 B2
(45) Date of Patent: Feb. 18, 2020

(54) PHASE DIFFERENCE COMPENSATION ELEMENT, LIQUID CRYSTAL DISPLAY DEVICE, AND PROJECTION-TYPE IMAGE DISPLAY DEVICE

(71) Applicant: Dexerials Corporation, Tokyo (JP)

(72) Inventors: Nobuyuki Koike, Tokyo (JP); Akio Takada, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 15/836,527

(22) Filed: Dec. 8, 2017

(65) Prior Publication Data

US 2018/0164642 A1 Jun. 14, 2018

(30) Foreign Application Priority Data

Dec. 9, 2016 (JP) ................. 2016-239542

(51) Int. Cl.
*G02F 1/13363* (2006.01)
*G02F 1/00* (2006.01)
(Continued)

(52) U.S. Cl.
CPC ..... *G02F 1/133632* (2013.01); *G02B 5/3016* (2013.01); *G02F 1/0054* (2013.01);
(Continued)

(58) Field of Classification Search
CPC ............ G02F 1/133632; G02F 1/0054; G02F 1/0311; G02F 1/0063; G02F 1/1395; G02F 2001/133635
See application file for complete search history.

(56) References Cited

U.S. PATENT DOCUMENTS 6,881,955 B2 4/2005 Lu et al.
7,659,946 B2 2/2010 Shirasaka et al.
(Continued)

FOREIGN PATENT DOCUMENTS

JP 2005-017298 A 1/2005
JP 2006-011298 A 1/2006
(Continued)

*Primary Examiner* — Hoan C Nguyen
(74) *Attorney, Agent, or Firm* — Osha Liang LLP

(57) ABSTRACT

An object is to provide a phase difference compensation element capable of improving the contrast of a liquid crystal display device while solving the problems of a high cost, an increase in the lead time, an increase in the mounting space, and the durability. A phase difference compensation element includes: a phase difference imparting and reflection preventing layer; a first birefringence layer and a second birefringence layer in which an angle of a corner formed by a main axis of refractive index anisotropy and a surface of a transparent substrate is not 90 degrees; a third birefringence layer in which an angle of a corner formed by a main axis of refractive index anisotropy and the surface of the transparent substrate is 0 degrees, wherein, when segments acquired when the main axes of the first, second, and third birefringence layers are projected onto the transparent substrate are respectively denoted by a segment A, a segment B, and a segment C, relations of the following (1) and (2) are satisfied. (1) The angle of the corner formed by the segment A and the segment B is 45 degrees or more and 70 degrees or less. (2) The segment A and the segment C are approximately parallel with each other, or the segment B and the segment C are approximately parallel with each other.

11 Claims, 22 Drawing Sheets

(51) Int. Cl.
　　*G02F 1/139*　　　(2006.01)
　　*G02F 1/03*　　　　(2006.01)
　　*G02B 5/30*　　　　(2006.01)
　　*G03B 21/00*　　　(2006.01)

(52) U.S. Cl.
　　CPC .......... *G02F 1/0063* (2013.01); *G02F 1/0311*
　　　　(2013.01); *G02F 1/1395* (2013.01); *G02F*
　　　　*2001/133635* (2013.01); *G02F 2413/01*
　　　　　(2013.01); *G03B 21/006* (2013.01)

(56) References Cited

U.S. PATENT DOCUMENTS

| | | | |
|---|---|---|---|
| 8,208,079 | B2 | 6/2012 | Tsukagoshi |
| 8,212,947 | B2 | 7/2012 | Tateno |
| 2004/0262518 | A1 | 12/2004 | Lu et al. |
| 2007/0076133 | A1 | 4/2007 | Shimizu et al. |
| 2008/0043158 | A1 | 2/2008 | Shirasaka et al. |
| 2009/0096970 | A1* | 4/2009 | Sakai ................... G02B 5/3016 349/117 |
| 2009/0128719 | A1 | 5/2009 | Tateno |
| 2009/0244412 | A1 | 10/2009 | Tsukagoshi |
| 2010/0026936 | A1* | 2/2010 | Uesaka ................. G02B 5/3033 349/75 |
| 2013/0177717 | A1* | 7/2013 | Koike ................... C23C 14/226 427/569 |
| 2015/0109557 | A1* | 4/2015 | Koike ................... G02B 5/3083 349/61 |

FOREIGN PATENT DOCUMENTS

| | | |
|---|---|---|
| JP | 2006-171327 A | 6/2006 |
| JP | 2007-101764 A | 4/2007 |
| JP | 2009-145863 A | 7/2009 |
| JP | 2009-229804 A | 10/2009 |
| JP | 4566275 B2 | 10/2010 |
| JP | 5271032 B2 | 8/2013 |
| WO | 2006/064956 A1 | 6/2006 |
| WO | 2008/081919 A1 | 7/2008 |

* cited by examiner

| DIELECTRIC FILM | FILM THICKNESS(nm) |
|---|---|
| $Nb_2O_5$ | 15 |
| $SiO_2$ | 53.74 |
| $Nb_2O_5$ | 40.35 |
| $SiO_2$ | 47.52 |
| $Nb_2O_5$ | 32.4 |
| $SiO_2$ | 55.07 |
| $Nb_2O_5$ | 33.54 |
| $SiO_2$ | 46.6 |
| $Nb_2O_5$ | 31.81 |
| $SiO_2$ | 53.47 |
| $Nb_2O_5$ | 33.19 |
| $SiO_2$ | 48.61 |
| $Nb_2O_5$ | 32.75 |
| $SiO_2$ | 54.15 |
| $Nb_2O_5$ | 32.44 |
| $SiO_2$ | 49.6 |
| $Nb_2O_5$ | 32.35 |
| $SiO_2$ | 53.73 |
| $Nb_2O_5$ | 32.25 |
| $SiO_2$ | 49.42 |
| $Nb_2O_5$ | 31.44 |
| $SiO_2$ | 54.95 |
| $Nb_2O_5$ | 31.2 |
| $SiO_2$ | 50.9 |
| $Nb_2O_5$ | 33.69 |
| $SiO_2$ | 57.5 |
| $Nb_2O_5$ | 31.19 |
| $SiO_2$ | 42.5 |
| $Nb_2O_5$ | 29.82 |
| $SiO_2$ | 52.02 |
| $Nb_2O_5$ | 30.38 |
| $SiO_2$ | 43.56 |
| $Nb_2O_5$ | 46.47 |
| $SiO_2$ | 104.48 |

FIG. 13

PHASE DIFFERENCE COMPENSATION ELEMENT, LIQUID CRYSTAL DISPLAY DEVICE, AND PROJECTION-TYPE IMAGE DISPLAY DEVICE

This application is based on and claims the benefit of priority from Japanese Patent Application No. 2016-239542, filed on 9 Dec. 2016, the content of which is incorporated herein by reference.

BACKGROUND OF THE INVENTION

Field of the Invention

The present invention relates to a phase difference compensation element, a liquid crystal display device, and a projection-type image display device.

Related Art

In recent years, in order to improve contrast characteristics and viewing-angle characteristics, optical compensation technologies using phase difference compensation elements are used in liquid crystal display devices. For example, there is a black luminance correction in a vertically-aligned liquid crystal. In addition, in order to correct a pre-tilt angle of liquid crystals and disorder in polarized light due to birefringence occurring in obliquely incident light, a method in which optical compensation is performed by arranging a phase difference element such as a crystal in parallel with the principal face of a liquid crystal panel and a method in which optical compensation is performed by arranging an organic material or the like having birefringence such as a polymer film in parallel with the principal face of a liquid crystal panel have been proposed (for example, see Patent Documents 1 to 3). However, in a case where a method in which a single crystal is processed as a phase difference compensation element is used, particularly, when compensation is performed also in consideration of a pre-tilt angle of the liquid crystal, it is necessary to cut out the material at a predetermined angle with respect to the crystal axis, and very high precision is necessary for the cutting-out, grinding, and the like of the material, whereby a high cost incurs. In addition, in a stretched film or the like, it is not easy to control the crystal axis.

For this reason, a method in which a phase difference compensation element is arranged to be tilted with respect to the principal face of the liquid crystal panel or the like has been proposed (for example, see Patent Documents 4 and 5). However, there is concern that a space for arranging the phase difference compensation element to be tilted with respect to the principal face of the liquid crystal panel is insufficient inside a projector for which the process of decreasing the size is in the progress. In addition, deterioration may easily occur for heat or UV rays, and there is a problem in the durability.

Thus, as a phase difference compensation element using formation of a thin film using oblique vapor deposition of a dielectric material, a phase difference compensation element acquired by combining a negative C- plate formed by alternately stacking high/low-refractive index materials and an O- plate formed by oblique vapor deposition films having a configuration of two or more layers has been proposed (for example, see Patent Document 6). In this phase difference compensation element, disorder in the polarized light of obliquely incident light in an optical modulation element is corrected by the negative C- plate having structural birefringence according to alternate stacking of the high/low-refractive index materials. In addition, disorder in polarized light according to the pre-tilt angle is corrected by the O- plate formed by the oblique vapor deposition films having the configuration of two or more layers. However, in order to produce the negative C- plate, stacking of a total of 80 layers is necessary, and, additionally, a reflection prevention film is necessary. Accordingly, there is concern that the cost becomes high, and a lead time becomes long.

In addition, an optical compensation method using two phase difference plates formed using oblique vapor deposition films has been proposed (for example, see Patent Document 7). In this optical compensation method, by setting a relation angle to an optimal position by rotating each of the phase difference plates in an in-plane direction, the contrast is considered to be improved. However, in this optical compensation method, two phase difference plates and a rotation mechanism are necessary, and there is concern that the cost becomes high, and the mounting space increases.

In a case where a plurality of birefringence elements are acquired by forming an oblique vapor deposition film on a substrate and cutting out the oblique deposition film into parts, when the oblique vapor deposition film is formed, there is a significant angle difference between a center portion and an peripheral edge portion of the substrate in a deposition direction. When the angle difference occurs, variations in the optical characteristics occur in the substrate, and the manufacturing efficiency decreases. For this reason, a method for cutting out a birefringence substrate in a radial pattern such that the direction of each birefringence element inside the birefringence substrate spreads from a side closer to a vapor deposition source of the oblique deposition film to a side farther therefrom has been proposed (for example, see Patent Document 8). However, in order to cut out the substrate into a radial pattern, naturally, a lead time increases to be longer than that of a case where the substrate is simply cut out into lattice shapes, and a special device for the cutting is necessary. In addition, the number of optical elements obtained from one substrate decreases, and there is also concern that the cost becomes high.

In addition, a liquid crystal display device has been proposed which includes at least two phase difference compensation layers arranged such that the layer faces thereof face each other and uses phase difference plates arranged such that the values of the phase difference and the directions inside the planes of optical axes corresponding to a leading axis and a lagged axis of a material forming the compensation layers are different from each other (for example, see Patent Document 9). However, since this liquid crystal display device is formed by bonding the two compensation layers, a bonding agent is necessary, and accordingly, there is a problem in the durability. In addition, two substrates are necessary, and there is concern that the cost becomes high as well.

Patent Document 1: Japanese Unexamined Patent Application, Publication No. 2005-17298
Patent Document 2: Japanese Unexamined Patent Application, Publication No. 2007-101764
Patent Document 3: Japanese Patent No. 4566275
Patent Document 4: Japanese Unexamined Patent Application, Publication No. 2006-11298
Patent Document 5: Japanese Unexamined Patent Application, Publication No. 2009-229804
Patent Document 6: Japanese Unexamined Patent Application, Publication No. 2006-171327

Patent Document 7: Japanese Unexamined Patent Application, Publication No. 2009-145863

Patent Document 8: Japanese Patent No. 5271032

Patent Document 9: PCT International Publication No. WO2008/081919

SUMMARY OF THE INVENTION

The present invention is in consideration of the description presented above, and an object thereof is to provide a phase difference compensation element capable of improving the contrast of a liquid crystal display device while solving the problems of a high cost, an increase in the lead time, an increase in the mounting space, and the durability.

In order to achieve the object described above, a first aspect of the present invention provides a phase difference compensation element including a phase difference imparting and reflection preventing layer that is formed by optical multiple layers and first, second, and third birefringence layers. More specifically, a phase difference compensation element (for example, a phase difference compensation element 10 to be described later) includes: a transparent substrate (for example, a transparent substrate 11 to be described later); a phase difference imparting and reflection preventing layer (for example, a phase difference imparting and reflection preventing layer 12 to be described later) that is formed by optical multiple layers, imparts a phase difference to obliquely incident light included in incident light, and prevents reflection of the incident light; a first birefringence layer (for example, a first birefringence layer 131 to be described later) that includes a first optical anisotropic inorganic material in which an angle of a corner formed by a main axis of refractive index anisotropy of the first optical anisotropic inorganic material and a surface of the transparent substrate is not 90 degrees; a second birefringence layer (for example, a second birefringence layer 132 to be described later) that includes a second optical anisotropic inorganic material in which an angle of a corner formed by a main axis of refractive index anisotropy of the second optical anisotropic inorganic material and the surface of the transparent substrate is not 90 degrees; and a third birefringence layer (for example, a third birefringence layer 133) that includes a third optical anisotropic inorganic material in which an angle of a corner formed by a main axis of refractive index anisotropy of the third optical anisotropic inorganic material and the surface of the transparent substrate is 0 degrees. When a segment acquired when the main axis of the refractive index anisotropy of the first optical anisotropic inorganic material is projected onto the surface of the transparent substrate is denoted by a segment A, a segment acquired when the main axis of the refractive index anisotropy of the second optical anisotropic inorganic material is projected onto the surface of the transparent substrate is denoted by a segment B, and a segment acquired when the main axis of the refractive index anisotropy of the third optical anisotropic inorganic material is projected onto the surface of the transparent substrate is denoted by a segment C, relations of the following (1) and (2) are satisfied.

(1) The angle of the corner formed by the segment A and the segment B is 45 degrees or more and 70 degrees or less.

(2) The segment A and the segment C are approximately parallel with each other, or the segment B and the segment C are approximately parallel with each other.

According to a second aspect of the present invention, in the phase difference compensation element as described in the first aspect, it is preferable that one or both of the first birefringence layer and the second birefringence layer are formed from an oblique deposition film.

According to a third aspect of the present invention, in the phase difference compensation element as described in the first or second aspect, it is preferable that the third birefringence layer is formed from stacked films in which oblique deposition films in directions opposing each other at 180 degrees are alternately stacked.

According to a fourth aspect of the present invention, in the phase difference compensation element as described in any one of the first to third aspects, it is preferable that at least one of the first optical anisotropic inorganic material, the second optical anisotropic inorganic material, and the third optical anisotropic inorganic material is an oxide containing at least one type selected from the group consisting of Si, Nb, Zr, Ti, La, Ta, and Al.

According to a fifth aspect of the present invention, in the phase difference compensation element as described in any one of the first to fourth aspects, it is preferable that a difference between a phase difference of the first birefringence layer and a phase difference of the second birefringence layer is less than 10 nm.

According to a sixth aspect of the present invention, in the phase difference compensation element as described in any one of the first to fifth aspects, it is preferable that a phase difference of the first birefringence layer and a phase difference of the second birefringence layer are approximately the same.

According to a seventh aspect of the present invention, in the phase difference compensation element as described in any one of the first to sixth aspects, it is preferable that a difference between a film thickness of the first birefringence layer or a film thickness of the second birefringence layer and a film thickness of the third birefringence layer is 60 nm or more and 80 nm or less.

According to an eighth aspect of the present invention, in the phase difference compensation element as described in any one of the first to seventh aspects, it is preferable that the third birefringence layer is formed from a high-refractive index dielectric material and has a comb-tooth structure.

According to a ninth aspect of the present invention, in the phase difference compensation element as described in any one of the first to seventh aspects, the third birefringence layer may be formed from a high-refractive index dielectric material and a low-refractive index dielectric material.

According to a tenth aspect of the present invention provides a liquid crystal display device (for example, a liquid crystal display device 100 to be described later) including: a liquid crystal panel (for example, a liquid crystal panel 20 to be described later) that includes a VA (vertical alignment)-mode liquid crystal layer containing liquid crystal molecules having a pre-tilt with respect to a direction orthogonal to a principal face of a substrate (for example, a substrate 21 to be described later) and modulates incident light fluxes; a first polarizing plate (for example, a first polarizing plate 31 to be described later) that is arranged on an incident side of the liquid crystal panel; a second polarizing plate (for example, a second polarizing plate 32 to be described later) that is arranged on an outgoing side of the liquid crystal panel; and the above-described phase difference compensation element (for example, a phase difference compensation element 10 to be described later) that is arranged on an optical path between the liquid crystal panel and the second polarizing plate.

According to an eleventh aspect of the present invention provides a projection-type image display device including: a light source that emits light; a projection optical system that projects modulated light; and the above-described liquid crystal display device (for example, a liquid crystal display device 100 to be described later) that is arranged on an optical path between the light source and the projection optical system.

According to the present invention, a phase difference compensation element can be provided which is capable of improving the contrast of a liquid crystal display device while solving the problems of a high cost, an increase in the lead time, an increase in the mounting space, and the heat resistance.

BRIEF DESCRIPTION OF THE DRAWINGS

FIG. 13 is a diagram that illustrates the composition of a phase difference imparting and reflection preventing film according to an example of the present invention.

DETAILED DESCRIPTION OF THE INVENTION

Hereinafter, an embodiment of the present invention will be described in detail with reference to the drawings.

[Phase Difference Compensation Element]

Figure 1:
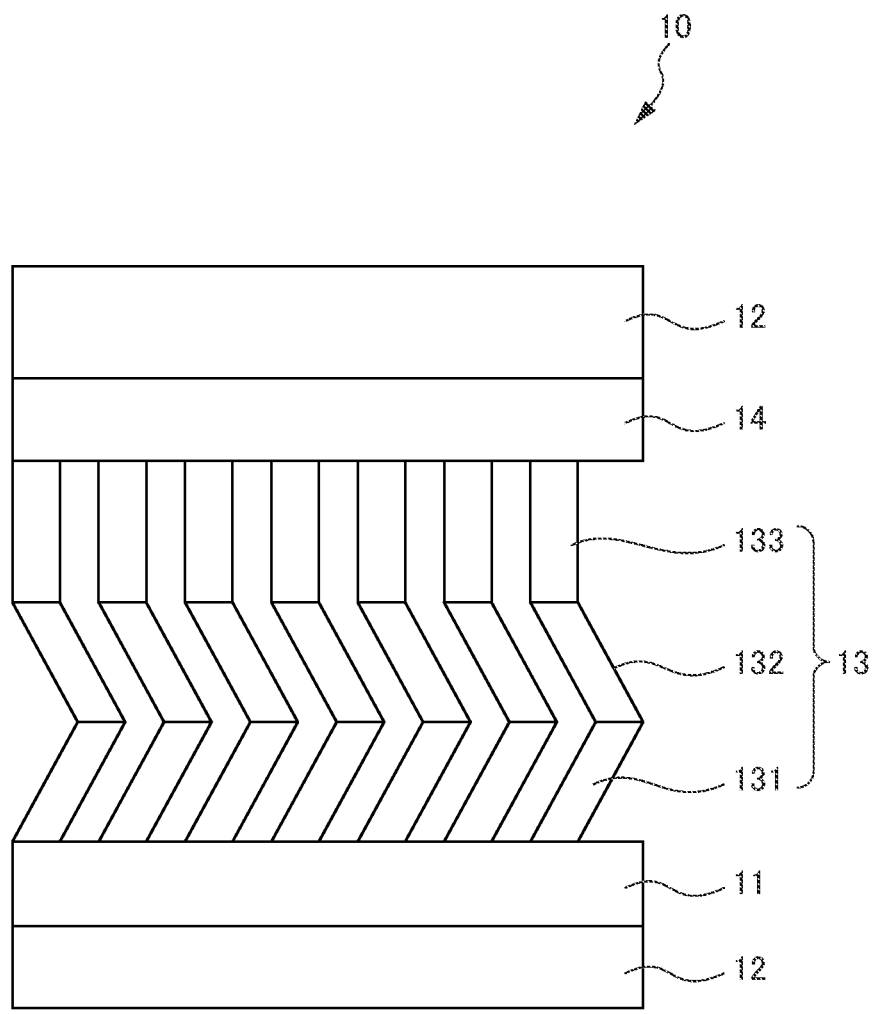
FIG. 1 is a schematic cross-sectional view of a phase difference compensation element according to one embodiment of the present invention.

FIG. 1 is a schematic cross-sectional view of a phase difference compensation element 10 according to one embodiment of the present invention. As illustrated in FIG. 1, the phase difference compensation element 10 according to this embodiment includes at least a transparent substrate 11, phase difference imparting and reflection preventing layers 12, and a birefringence layer 13 formed by a first birefringence layer 131, a second birefringence layer 132, and a third birefringence layer 133. In addition, the phase difference compensation element 10 according to this embodiment includes a protection layer 14 as is necessary.

The transparent substrate 11 is arranged between the phase difference imparting and reflection preventing layers 12 and the birefringence layer 13. As the transparent substrate 11, a substrate having light transmitting property for light of a desired use wavelength band is used. For example, the transparent substrate 11 is a substrate formed using glass, quartz, crystal, or the like. As the shape of the transparent substrate 11, generally, a rectangle is employed, and a shape according to the purpose is appropriately selected. The thickness of the transparent substrate 11, for example, is preferably in the range of 0.1 to 3.0 mm.

The phase difference imparting and reflection preventing layers 12 are arranged on both sides of the birefringence layer 13 in the phase difference compensation element 10 according to this embodiment. The phase difference imparting and reflection preventing layers 12 functions as a reflection preventing film for a desired use wavelength band and has a function capable of imparting an arbitrary phase difference for obliquely incident light having a predetermined angle. Here, the obliquely incident light represents light that is incident at a predetermined angle with respect to front-surface incident light in a direction orthogonal to the incident surface.

In addition, in the phase difference compensation element 10 according to this embodiment, since the phase difference imparting and reflection preventing layers 12 are arranged on both sides of the birefringence layer 13, the directions of the incident side and the outgoing side are not limited. In other words, any one of the two phase difference imparting and reflection preventing layers 12 may be arranged toward the incident side, and similarly, any one thereof may be arranged toward the outgoing side.

Figure 2:
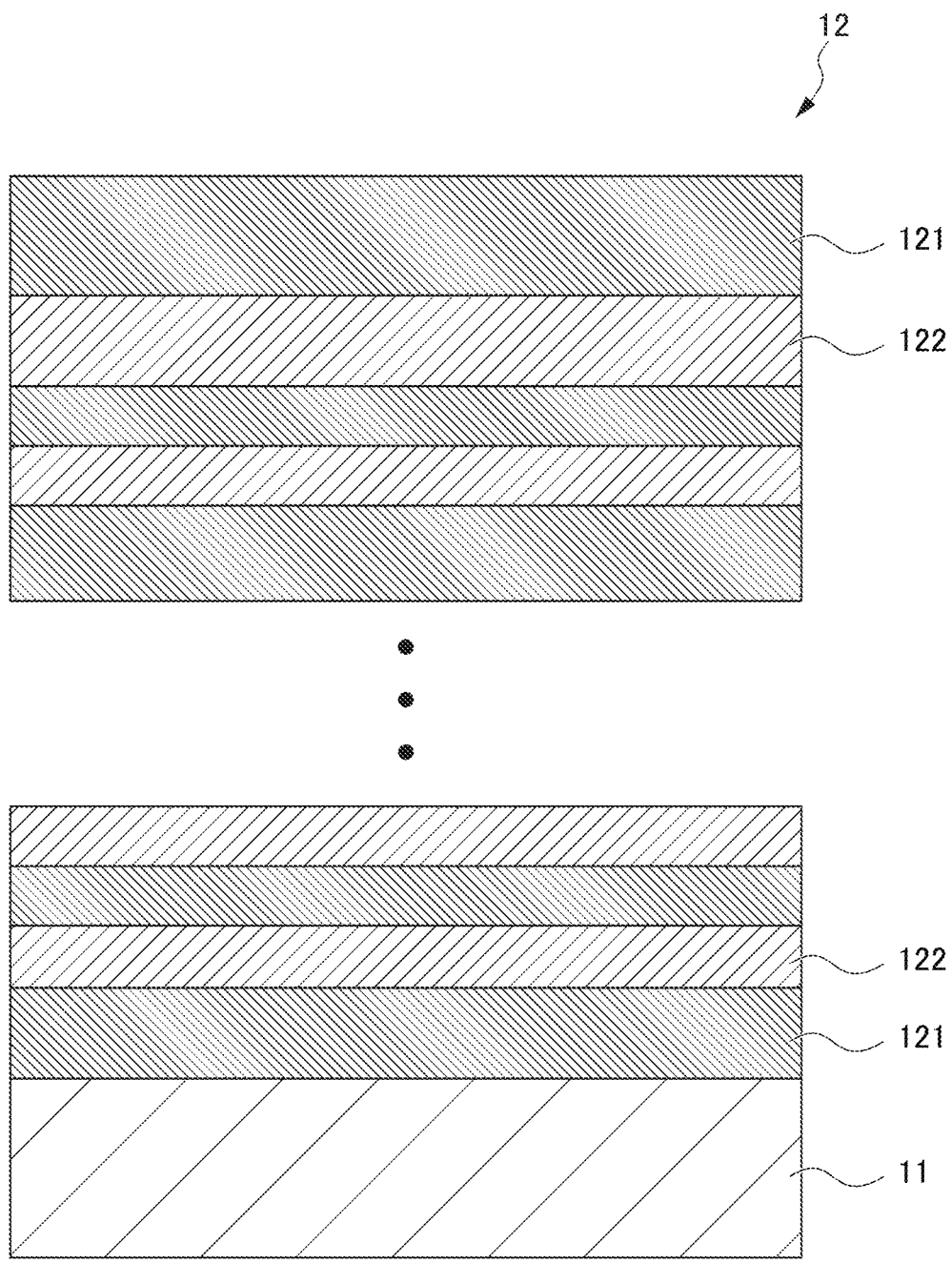
FIG. 2 is a schematic cross-sectional view of a phase difference imparting and reflection preventing layer according to one embodiment of the present invention.

FIG. 2 is a schematic cross-sectional view of the phase difference imparting and reflection preventing layer 12 according to this embodiment. As illustrated in FIG. 2, the phase difference imparting and reflection preventing layer 12 is an optical multi-layer film formed by stacking dielectric films of two or more types having mutually-different refractive indexes. In this embodiment, the phase difference imparting and reflection preventing layer 12 is configured as a dielectric multi-layer film in which a first dielectric film 121 and a second dielectric film 122 are alternately stacked. For example, as the phase difference imparting and reflection preventing layer 12, a dielectric multi-layer film formed by a total of 34 layers in which the first dielectric film 121 and the second dielectric film 122 are alternately stacked is used.

Each of the first dielectric film 121 and the second dielectric film 122 is configured by a dielectric film formed by at least one type of an inorganic oxide selected from the group consisting of $TiO_2$, $SiO_2$, $Ta_2O_5$, $Al_2O_3$, $CeO_2$, $ZrO_2$, $ZrO$, and $Nb_2O_5$. For example, $Nb_2O_5$ having a relatively high refractive index is used as the first dielectric film 121, and $SiO_2$ having a relatively low refractive index is used as the second dielectric film 122.

Here, in the phase difference compensation element disclosed in Patent Document 6 described above, in a case where a phase difference in the film thickness direction is expressed using an optical multi-layer film called structural birefringence, an optical interference effect is not used. For example, when the dielectric films of two types are a dielectric film a and a dielectric film b, it is necessary to stack near 100 layers with stacking of the dielectric film a and the dielectric film b configured as one constituent unit. At this time, the thickness of the dielectric film a is the same in the multi layers, and the thickness of the dielectric film b is the same in the multi layers. For this reason, in such an optical multi-layer film, it is necessary to additionally arranged reflection preventing films on both sides thereof.

In contrast to this, the phase difference imparting and reflection preventing layer 12 according to this embodiment aggressively uses the optical interference effect (multiple reflection) to generate a phase difference in obliquely incident light toward the dielectric film. In addition, the phase difference imparting and reflection preventing layers 12 according to this embodiment also functions as a reflection preventing film. In other words, the phase difference imparting and reflection preventing layers 12 can control a phase difference of the obliquely incident light and prevent reflection of the incident light. For this reason, the thicknesses of the dielectric films do not need to be the same, and the number of stacked layers can be relatively decreased. This is fundamentally difference from a conventional idea of the design.

Accordingly, in order to have a reflection preventing function and freely control a phase difference of obliquely incident light to some degree, by configuring the thicknesses of the dielectric films to be different from each other and configuring the number of stacked layers to be optimal, a practical phase difference imparting and reflection preventing film can be produced. In this way, a deviation of the phase difference of the obliquely incident light occurring in the liquid crystal panel that cannot be completely compensated by the birefringence layer 13 to be described later can be corrected. In description presented here, the film thickness represents an average film thickness. In addition, the phase difference imparting and reflection preventing layer 12 according to this embodiment is preferably designed such that a phase difference imparted to obliquely incident light that is tilted by 15 degrees with respect to a direction (hereinafter, referred to as a substrate normal line direction) orthogonal to the surface of the transparent substrate is in the range of 1.0 to 25.0 nm.

The birefringence layer 13 is arranged between the two phase difference imparting and reflection preventing layers 12. The birefringence layer 13 is configured by three layers including a first birefringence layer 131, a second birefringence layer 132, and a third birefringence layer 133. All of these first birefringence layer 131, second birefringence layer 132, and third birefringence layer 133 are composed using inorganic materials having optical anisotropy.

Figure 3:
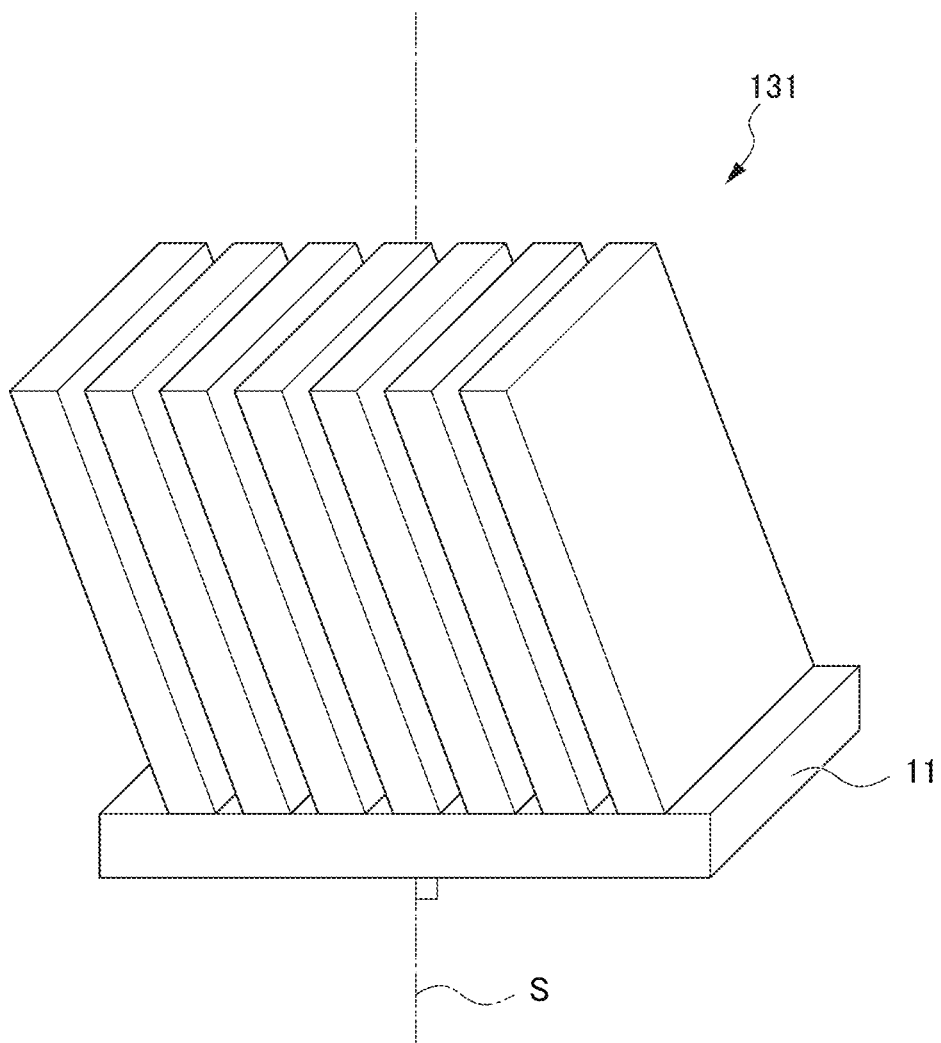
FIG. 3 is a schematic perspective view of a first birefringence layer according to one embodiment of the present invention.
Figure 4:
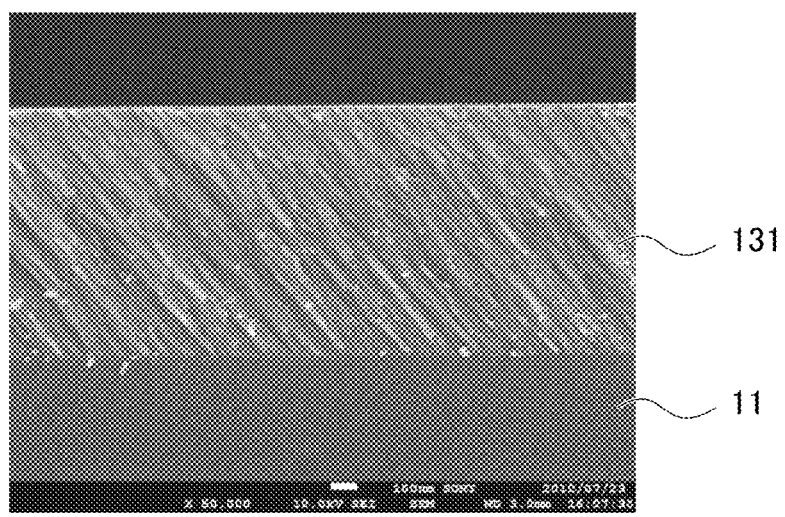
FIG. 4 is a cross-sectional SEM photograph of the first birefringence layer according to one embodiment of the present invention.

FIG. 3 is a schematic perspective view of the first birefringence layer 131 according to this embodiment. FIG. 4 is a cross-sectional SEM photograph of the first birefringence layer 131 according to this embodiment. As illustrated in FIGS. 3 and 4, the first birefringence layer 131 according to this embodiment is configured by a film formed by being deposited in a direction tilted with respect to the substrate normal line S. More specifically, the first birefringence layer 131 is preferably configured by an obliquely deposition film formed through oblique vapor deposition from a vapor deposition source arranged at a position tilted with respect to the substrate normal line S.

Accordingly, in the first birefringence layer 131 having the configuration described above, the angle of a corner formed by the main axis of the refractive index anisotropy of a first optical anisotropic inorganic material composing the first birefringence layer 131 and the surface of the transparent substrate 11 is not 90 degrees. In description presented here, the main axis of the refractive index anisotropy represents a direction in which the refractive index is the largest in the optical anisotropic inorganic material composing the birefringence layer.

The first birefringence layer 131 is composed using the first optical anisotropic inorganic material. As the first optical anisotropic inorganic material, a dielectric material is used, and an oxide containing at least one type selected from the group consisting of Si, Nb, Zr, Ti, La, Ta, and Al is preferably used. More specifically, a material having $Ta_2O_3$ as its main component is preferably used, and a material acquired by adding $TiO_2$ of 5 to 15 mass % to $Ta_2O_3$ is more preferably used.

The second birefringence layer 132 according to this embodiment, similar to the first birefringence layer 131 described above, is configured by a film formed in a direction tilted with respect to the substrate normal line S direction. More specifically, the second birefringence layer 132 is preferably configured by an oblique deposition film formed through oblique vapor deposition from a vapor deposition source arranged at a position tilted with respect to the substrate normal line S direction.

Accordingly, in the second birefringence layer 132 having the configuration described above, similar to the first birefringence layer 131, the angle of a corner formed by the main axis of the refractive index anisotropy of a second optical anisotropic inorganic material composing the second birefringence layer 132 and the surface of the transparent substrate 11 is not 90 degrees.

The second birefringence layer 132 is composed using a second optical anisotropic inorganic material. As the second optical anisotropic inorganic material, a dielectric material is used, and an oxide containing at least one type selected from the group consisting of Si, Nb, Zr, Ti, La, Ta, and Al is preferably used. More specifically, a material having $Ta_2O_3$ as its main component is preferably used, and a material acquired by adding $TiO_2$ of 5 to 15 mass % to $Ta_2O_3$ is more preferably used. As the second optical anisotropic inorganic material, the same material as the first optical anisotropic inorganic material may be used, or a material different from the first optical anisotropic inorganic material may be used.

Figure 5:
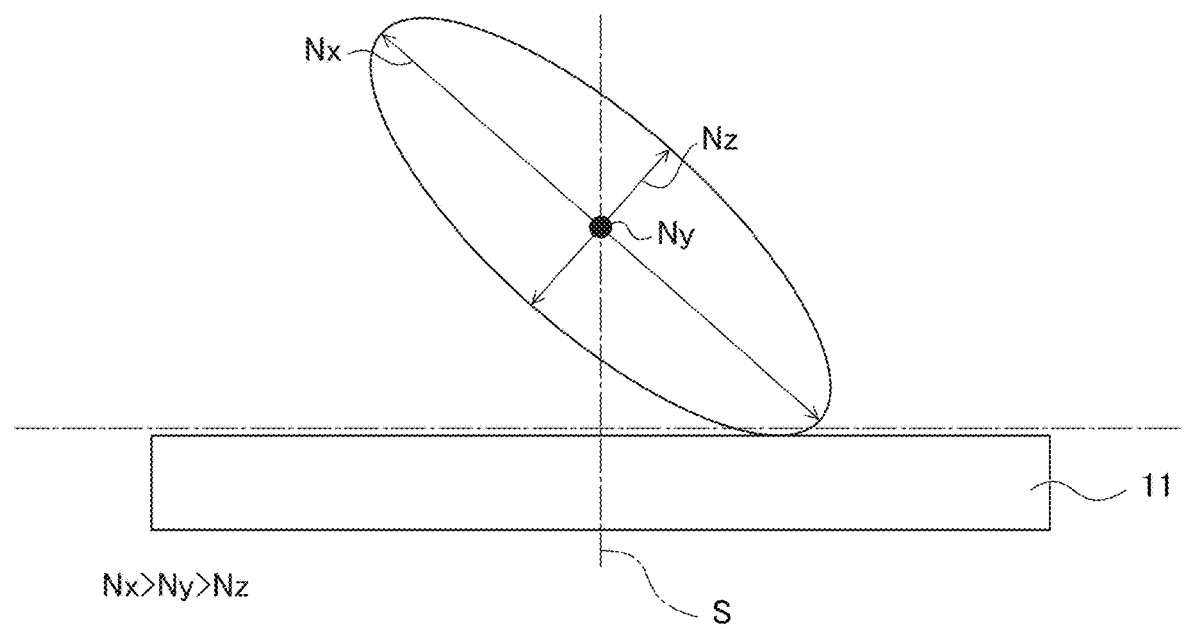
FIG. 5 is a schematic view of a refractive index ellipsoid of the first birefringence layer according to one embodiment of the present invention.

Here, FIG. 5 is a schematic view of a refractive index ellipsoid of the first birefringence layer 131. A refractive index ellipsoid of the second birefringence layer 132 is similar to that illustrated in FIG. 5. In description presented here, when a refractive index in the main axis direction of the refractive index anisotropy is Nx, as illustrated in FIG. 5, Nx is in a direction parallel to a vapor deposition direction. When a refractive index in a direction orthogonal to both the Nx direction and the substrate normal line S is denoted by Ny, and a refractive index in a direction orthogonal to both Nx, and Ny is denoted by Nz, Nx is the largest, and a relation of "Nx>Ny>Nz" is satisfied. The refractive indexes of the first birefringence layer 131 and the second birefringence layer 132 configured by oblique vapor deposition films have characteristics represented by such refractive index ellipsoids.

A difference between the phase difference of the first birefringence layer 131 and the phase difference of the second birefringence layer 132 is preferably 10 nm or less. In addition, the phase difference of the first birefringence layer 131 and the phase difference of the second birefringence layer 132 are more preferably approximately the same. In description presented here, "approximately the same" represents that a difference between both parties is 3 nm or less.

The film thickness of the first birefringence layer 131 and the film thickness of the second birefringence layer 132 are preferably approximately the same.

Figure 6:
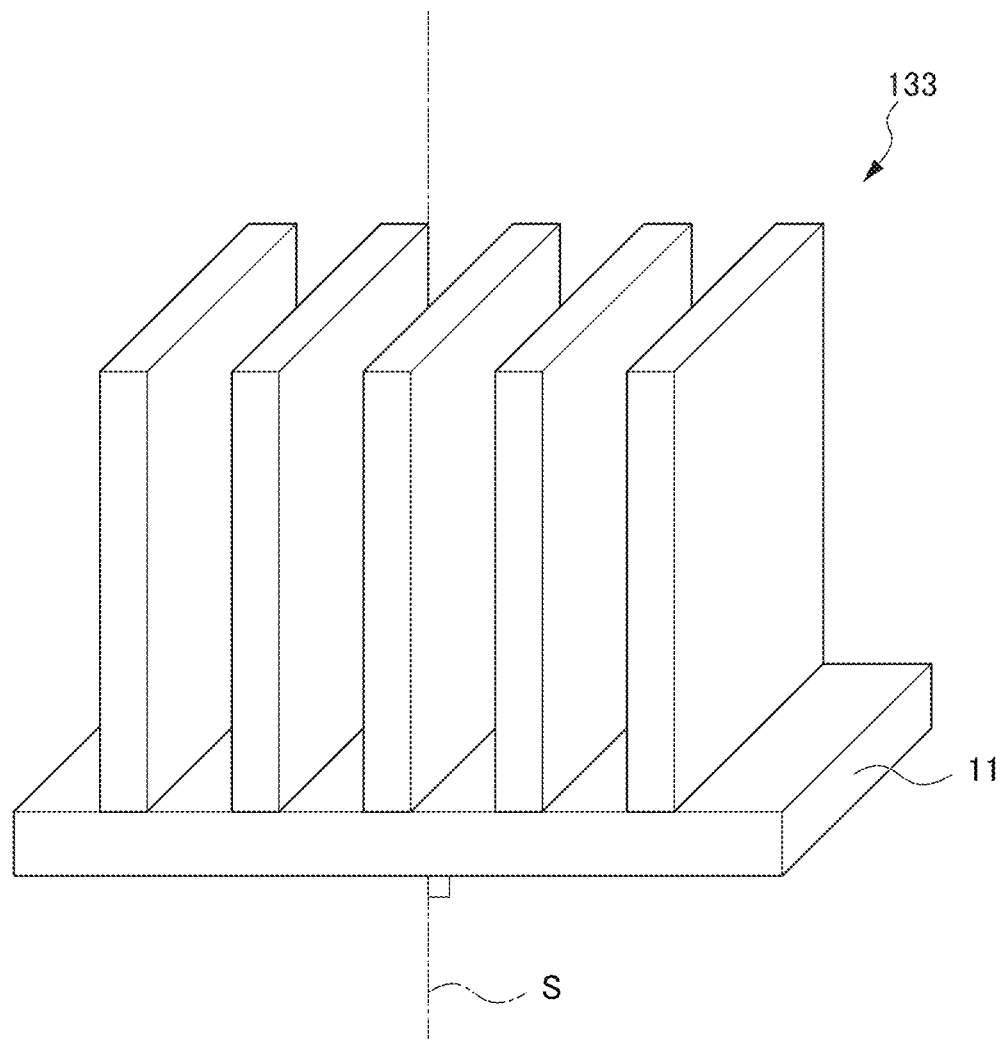
FIG. 6 is a schematic perspective view of one example of a third birefringence layer according to one embodiment of the present invention.

FIG. 6 is a schematic perspective view of one example of the third birefringence layer 133 according to this embodiment. In FIG. 6, for the convenience of illustration, the first birefringence layer 131 and the second birefringence layer 132 are not illustrated (this similarly applies in FIGS. 7 to 9 to be described later). As illustrated in FIG. 6, the third birefringence layer 133 according to this embodiment is configured by films that are formed to be deposited in a direction parallel to the substrate normal line S.

The third birefringence layer 133 is composed using a third optical anisotropic inorganic material. As the third optical anisotropic inorganic material, a dielectric material is used, and an oxide containing at least one type selected from the group consisting of Si, Nb, Zr, Ti, La, Ta, and Al is preferably used. More specifically, a material having $Ta_2O_3$ as its main component is preferably used, and a material acquired by adding $TiO_2$ of 5 to 15 mass % to $Ta_2O_3$ is more preferably used. As the third optical anisotropic inorganic material, the same material as the first optical anisotropic inorganic material or the second optical anisotropic inorganic material may be used, or a material different from the first optical anisotropic inorganic material or the second optical anisotropic inorganic material may be used.

In addition, in this embodiment, at least one of the first optical anisotropic inorganic material, the second optical anisotropic inorganic material, and the third optical anisotropic inorganic material is preferably composed using an oxide containing at least one type selected from the group consisting of Si, Nb, Zr, Ti, La, Ta, and Al.

Also among the dielectric materials formed using the oxides listed above, a high-refractive index dielectric material is preferably used as the third optical anisotropic inorganic material composing the third birefringence layer 133. In addition, the third birefringence layer 133 may be composed using both a high-refractive index dielectric material and a low-refractive index dielectric material.

The film thickness of the third birefringence layer 133 preferably has a difference from the film thickness of the first birefringence layer 131 or the film thickness of the second birefringence layer 132 to be in the range of 60 to 80 nm. When a difference between the film thickness of the third birefringence layer 133 and the film thickness of the first birefringence layer 131 or the film thickness of the second birefringence layer 132 is within this range, high contrast can be obtained regardless of the film thickness of the third birefringence layer 133.

The third birefringence layer 133 is produced such that the main axis (in other words, the Nx direction) of the refractive index anisotropy of the third optical anisotropic inorganic material is in the plane direction of the surface of the transparent substrate 11. Accordingly, in the third birefringence layer 133, the angle of a corner formed by the main axis of the refractive index anisotropy of the third optical anisotropic inorganic material composing the third birefringence layer 133 and the surface of the transparent substrate 11 is 0 degrees.

In addition, as illustrated in FIG. 6, in the third birefringence layer 133, the third optical anisotropic inorganic material is formed in a comb-tooth shape at a pitch that is sufficiently smaller than the wavelength of the use band. Furthermore, the film thickness is preferably adjusted to a desired amount of birefringence. Such a structure can be produced by performing vacuum film formation of a high birefringence dielectric material on the second birefringence layer 132, forming the pattern at the pitch described above through photolithography or nanoimprint on the formed high-refractive index dielectric material, and performing etching. Accordingly, a comb-tooth shape of an air layer and the high-refractive index dielectric material is formed to function as the third birefringence layer 133. In order to adjust the refractive index or avoid a change in the refractive index due to deposition of dusts or the like inside the air layer in the comb-tooth shape, in other words, in order to secure the reliability, a material having a different refractive index may be buried inside the air layer.

Figure 7:
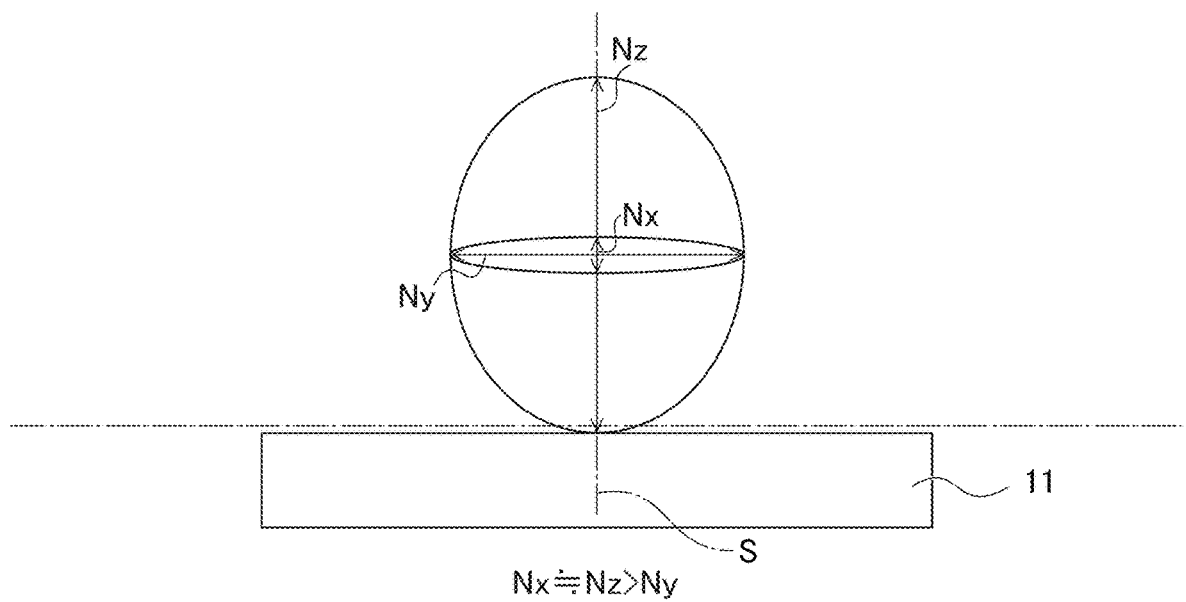
FIG. 7 is a schematic view of a refractive index ellipsoid of the third birefringence layer according to one embodiment of the present invention.

FIG. 7 is a schematic view of a refractive index ellipsoid of the third birefringence layer 133. As illustrated in FIG. 7, the magnitudes of Nx and Nz are approximately the same and the largest, and a relation of Nx≈Nz>Ny is satisfied. The refractive index of the third birefringence layer 133 has characteristics represented by such a refractive index ellipsoid.

In the method of production described above, patterning is included, and the production process is complex. Thus, it is preferable to produce a pseudo comb-tooth shape using oblique vapor deposition. In addition, it is preferable to produce a pseudo comb-tooth shape by alternately performing oblique vapor deposition in a direction opposing the in-plane direction of the transparent substrate 11 at 180 degrees. In such a case, the third birefringence layer 133 is configured by stacked films in which oblique deposition films in directions opposing each other at 180 degrees are alternately stacked.

Figure 8:
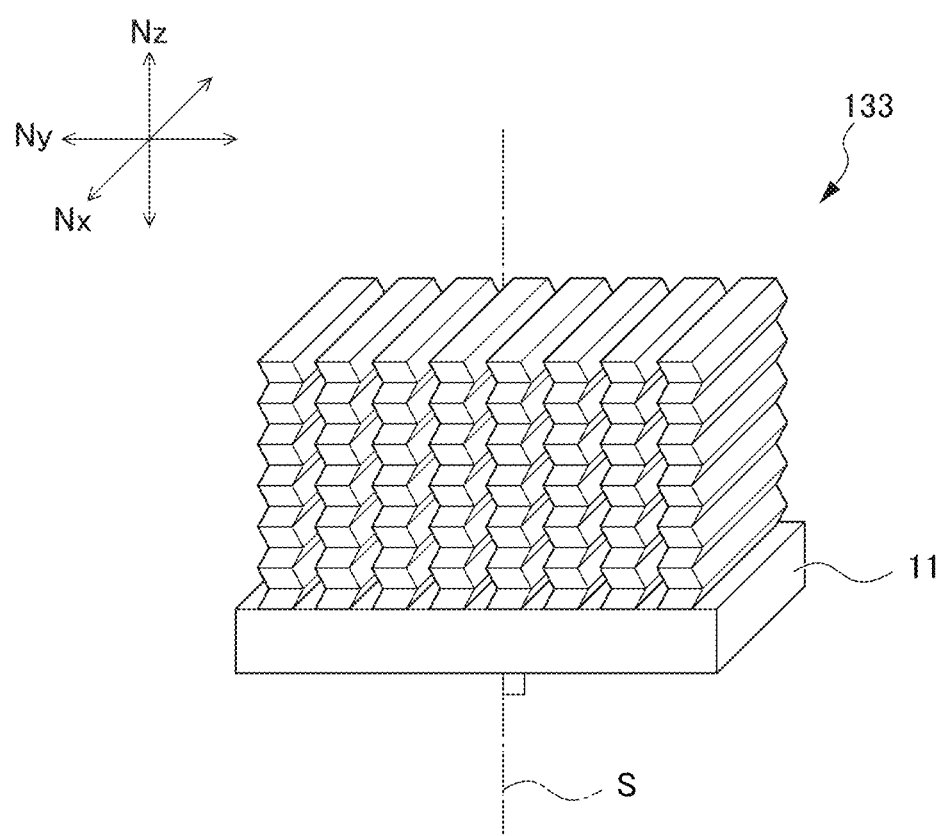
FIG. 8 is a schematic perspective view of another example of the third birefringence layer according to one embodiment of the present invention which is formed by alternately stacking oblique vapor deposition films in directions opposing each other at 180 degrees.
Figure 9:
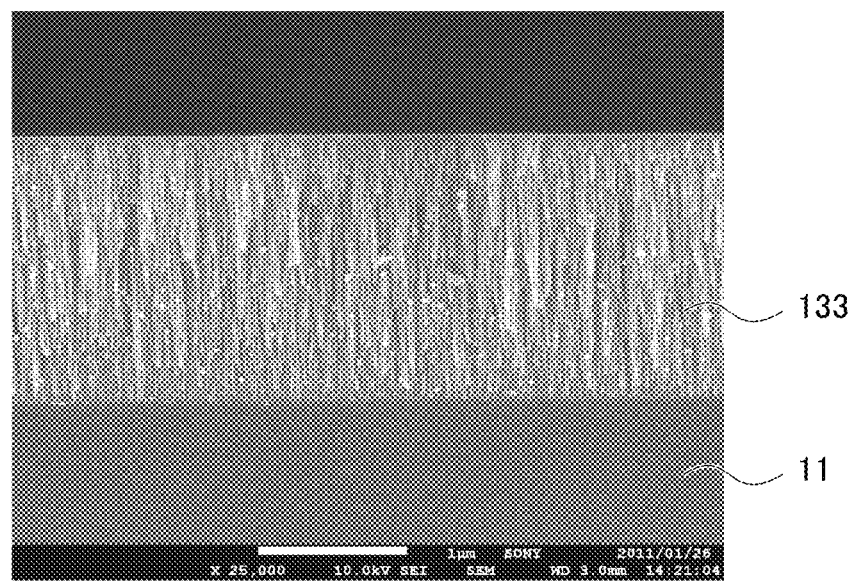
FIG. 9 is a cross-sectional SEM photograph of another example of the third birefringence layer according to one embodiment of the present invention which is formed by alternately stacking oblique vapor deposition films in directions opposing each other at 180 degrees.

FIG. 8 is a schematic perspective view of another example of the third birefringence layer 133 which is formed by alternately stacking oblique vapor deposition films in directions opposing each other at 180 degrees. FIG. 9 is a cross-sectional SEM photograph of another example of the third birefringence layer 133 which is formed by alternately stacking oblique vapor deposition films in directions opposing each other at 180 degrees. As illustrated in FIGS. 8 and 9, according to the stacked films in which oblique vapor deposition films are alternately stack in directions opposing each other at 180 degrees, a pseudo comb-tooth shape can be formed. In addition, the angle of a corner formed by the main axis of the refractive index anisotropy of the third optical anisotropic inorganic material composing the third birefringence layer 133 and the surface and the surface of the transparent substrate 11 is 0 degrees, and the refractive index has characteristics represented by the refractive index ellipsoid illustrated in FIG. 7.

Furthermore, in another example of the third birefringence layer 133, the thickness of each layer to be stacked may be configured to be sufficiently small, and the thickness is preferably 10 nm or less. In such a case, vapor deposition particles are self-structured according to a so-called shadowing effect of oblique vapor deposition in the substrate normal line S direction and are deposited in a direction perpendicular to the surface of the transparent substrate 11 with slight gaps, whereby a pseudo comb-tooth shape can be realized. The "pseudo comb-tooth shape" of such a case represents not a comb-tooth shape configured by lines each having a rectangular parallelepiped shape when viewed from the surface of the transparent substrate 11 and spaces but a structure in which the main axis of the refractive index anisotropy of the birefringence layer is directed perpendicular to the vapor deposition direction as a whole although a non-linear component is included therein. Also in this case, a desired amount of birefringence can be achieved according to the film thickness adjustment. The production can be performed only through film formation, and this method is advantageous in actual production. In the cross-sectional shape, one layer is thickened, and the side face has a concave-convex shape. By configuring the thickness of each layer to be thin, the amount of concave-convex decreases to improve the linearity, and the cross-section can be formed to be equivalent to the comb-tooth cross-section formed through lithography and etching.

Figure 10:
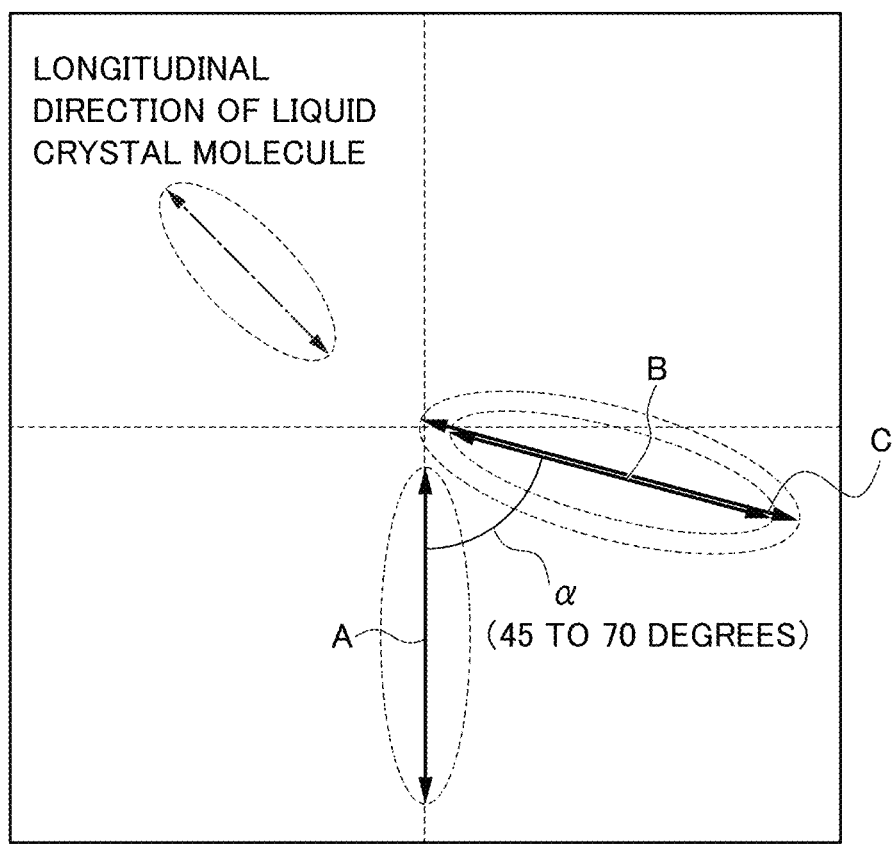
FIG. 10 is a plan view that illustrates the position of the main axis of the refractive index anisotropy of each optical anisotropic inorganic material when a phase difference compensation element according to this embodiment is projected onto the surface of a transparent substrate in a substrate normal line direction.

Next, the positional relation of the main axes of the refractive index anisotropy of the optical anisotropic inorganic materials composing birefringence layers will be described in detail. FIG. 10 is a plan view that illustrates the position of the main axis of the refractive index anisotropy of each optical anisotropic inorganic material when the phase difference compensation element 10 according to this embodiment is projected onto the surface of the transparent substrate 11 in the substrate normal line S direction. FIG. 10 illustrates the longitudinal direction of liquid crystal molecules of the liquid crystal panel. From FIG. 10, a positional relation between the main axis direction of the refractive index anisotropy and the longitudinal direction of the liquid crystal molecules in each birefringence layer in the in-plane direction of the transparent substrate 11 can be acquired.

Figure 11:
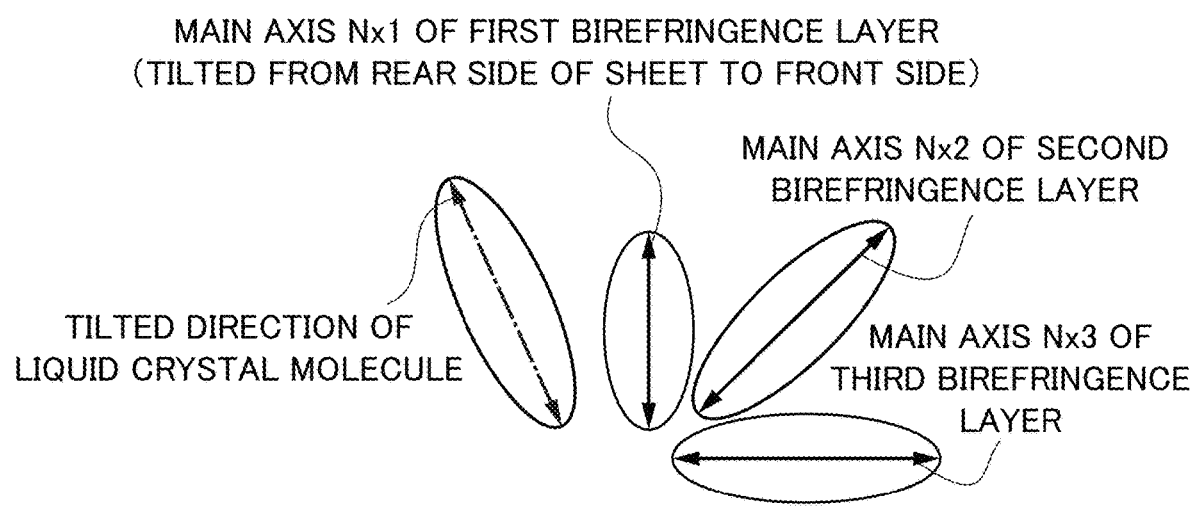
FIG. 11 is a diagram that illustrates a tilt direction and a main-axis direction of each of liquid crystal molecules, a first birefringence layer, a second birefringence layer, and a third birefringence layer in a case where they are assumed to be aligned on a same plane.

FIG. 11 is a diagram that illustrates a tilt direction and a main-axis direction of each of liquid crystal molecules, the first birefringence layer 131, the second birefringence layer 132, and the third birefringence layer 133 in a case where they are assumed to be aligned on a same plane. Here, the main axis Nx of the refractive index anisotropy of the first optical anisotropic inorganic material composing the first birefringence layer 131 is denoted by Nx1, the main axis Nx of the refractive index anisotropy of the second optical anisotropic inorganic material composing the second birefringence layer 132 is denoted by Nx2, and the main axis Nx of the refractive index anisotropy of the third optical anisotropic inorganic material composing the third birefringence layer 133 is denoted by Nx3. From FIG. 11, a positional relation between the main-axis direction of the refractive index anisotropy of each birefringence layer and the tilt direction of liquid crystal molecules in the normal line direction of the transparent substrate 11 is acquired.

As illustrated in FIG. 10, a segment acquired when the main axis of the refractive index anisotropy of the first optical anisotropic inorganic material composing the first birefringence layer 131 is projected onto the surface of the transparent substrate 11 is a segment A. In addition, a segment acquired when the main axis of the refractive index anisotropy of the second optical anisotropic inorganic material composing the second birefringence layer 132 is projected onto the surface of the transparent substrate 11 is a segment B. Furthermore, a segment acquired when the main axis of the refractive index anisotropy of the third optical anisotropic inorganic material composing the third birefringence layer 133 is projected onto the surface of the transparent substrate 11 is a segment C. At this time, in the phase difference compensation element 10 according to this embodiment, the following relations of (1) and (2) are satisfied.

(1) The angle of a corner α formed by the segment A and the segment B is 45 degrees or more and 70 degrees or less.
(2) The segment A and the segment C are approximately parallel with each other, or the segment B and the segment C are approximately parallel with each other.

Regarding this, FIG. 10 illustrates a case where the angle of the corner α formed by the segment A and the segment B is, for example, 67 degrees. In addition, FIG. 10 illustrates a case where the segment B and the segment C are parallel with each other. In description presented here, the corner α formed by the segment A and the segment B represents a smaller corner (minor angle) out of corners formed when the segments are moved in parallel such that the start points of the segments overlap each other.

In a case where the first birefringence layer 131 and the second birefringence layer 132 are formed through oblique vapor deposition, the size of the corner α formed by the segment A and the segment B can be adjusted by changing a corner formed by vapor deposition directions thereof. In other words, in a case where the first birefringence layer 131 and the second birefringence layer 132 are formed using a fixed single vapor deposition source, when the second birefringence layer 132 is formed through oblique vapor deposition, by rotating the transparent substrate 11 on which the first birefringence layer 131 already has been formed in the in-plane direction, the size of the corner α formed by the segment A and the segment B can be adjusted. In such a case, the size of the corner α formed by the segment A and the segment B is determined according to a rotation angle by which the transparent substrate 11 on which the first birefringence layer 131 is formed is rotated in the in-plane direction when the second birefringence layer 132 is formed.

On the other hand, in a case where the transparent substrate 11 is fixed, and the first birefringence layer 131 and the second birefringence layer 132 are formed using two vapor deposition sources arranged in mutually-different directions, by changing a relative position of the two vapor deposition sources, the size of the corner α formed by the segment A and the segment B can be adjusted. In such a case, the size of the corner α formed by the segment A and the segment B is determined according to a corner formed by the vapor deposition directions of the two vapor deposition sources.

In addition, in order to configure the segment A and the segment C to be in parallel with each other, in a case where the first birefringence layer 131 and the third birefringence layer 133 are formed through the oblique vapor deposition, the configuration can be formed by matching the positions in the vapor deposition direction in the in-plane direction of the transparent substrate 11. Similarly, in order to configure the segment B and the segment C to be in parallel with each other, in a case where the second birefringence layer 132 and the third birefringence layer 133 are formed through the oblique vapor deposition, the configuration can be formed by matching the positions in the vapor deposition direction in the in-plane direction of the transparent substrate 11.

As illustrated in FIGS. 10 and 11, it is preferable that the liquid crystal panel and each birefringence layer is arranged such that the tilted direction of the liquid crystal molecules forms an angle of 90 degrees or more with respect to the main axes of Nx1, Nx2, and Nx3. In such a case, by using the in-plane birefringence according to the first birefringence layer 131, the second birefringence layer 132, and the third birefringence layer 133, disorder in polarized light occurring according to a pre-tilt angle of the liquid crystal molecules in the liquid crystal panel can be corrected. More specifically, by using the first birefringence layer 131, the second birefringence layer 132, and the third birefringence layer 133, at least one of changes in the characteristics of light transmitted through the liquid crystal panel, in other words, basic characteristic parameters of light such as a change in the traveling direction, a change in the polarized state, a frequency, and the like of the light can be corrected. Accordingly, changes in the characteristics of light according to the pre-tilt angle of the liquid crystal molecules can be effectively corrected with high accuracy.

Referring back to FIG. 1, the protection layer 14 according to this embodiment is arranged on the third birefringence layer 133. This protection layer 14 is provided for the prevention of a bending state of the phase difference compensation element 10 and the improvement of the humidity resistance of the birefringence layer. As the protection layer 14, a layer, of which tension can be adjusted, having an effect for the improvement of the humidity resistance may be used, and, for example, a thin film of $SiO_2$ or the like is used.

An example of a method of manufacturing the phase difference compensation element 10 having the configuration described above according to this embodiment will be described. First, for example, $SiO_2$ and $Nb_2O_5$ are alternately stacked on one face of the transparent substrate 11 by using a sputtering method or the like, whereby the phase difference imparting and reflection preventing layer 12 is formed.

Thereafter, on the other face of the transparent substrate 11, for example, oblique vapor deposition of a vapor deposition material acquired by adding $TiO_2$ to $Ta_2O_5$ is performed with a vapor deposition source arranged at a position tilted by a predetermined angle with respect to the substrate normal line S direction, whereby the first birefringence layer 131 is formed. Subsequently, after the transparent substrate 11 is rotated by a predetermined angle in the in-plane direction, oblique vapor deposition from the vapor deposition source described above is performed, whereby the second birefringence layer 132 is formed on the first birefringence layer 131. In this way, the first birefringence layer 131 in which the angle of the corner formed by the main axis of the refractive index anisotropy and the surface of the transparent substrate 11 is not 90 degrees and the second birefringence layer 132 in which the angle of the corner formed by the main axis of the refractive index anisotropy and the surface of the transparent substrate 11 is not 90 degrees are formed.

Thereafter, oblique vapor deposition from the vapor deposition source described above is performed between the position at this time and a position acquired by further rotating the transparent substrate in the in-plane direction by 180 degrees being alternately switched, whereby the third birefringence layer 133 is formed on the second birefringence layer 132. In this way, the third birefringence layer 133 is formed in which the angle of a corner formed by the main axis of the refractive index anisotropy and the surface of the transparent substrate 11 is 0 degrees.

After the vapor deposition, for de-colorization and evaporation of moisture sucked in columnar structures, annealing process is performed at 100° C. or higher. The reason for this is that, in a case where moisture is attached between columnar structures, the refractive index of the vapor deposition film changes, and the characteristic drastically changes. In a case where the annealing temperature is too high, the columnar structures grow to form a columnar shape, and a decrease in the birefringence, a decrease in the transmittance, and the like occur. Accordingly, the annealing temperature is preferably 300° C. or less.

Thereafter, a protection layer is formed on the third birefringence layer 133. Thereafter, in order to improve the transmittance, the phase difference imparting and reflection preventing layer 12 is formed using a sputtering method. As above, the phase difference compensation element 10 according to this embodiment is manufactured.

[Liquid Crystal Display Device and Projection-Type Image Display Device]

Figure 12:
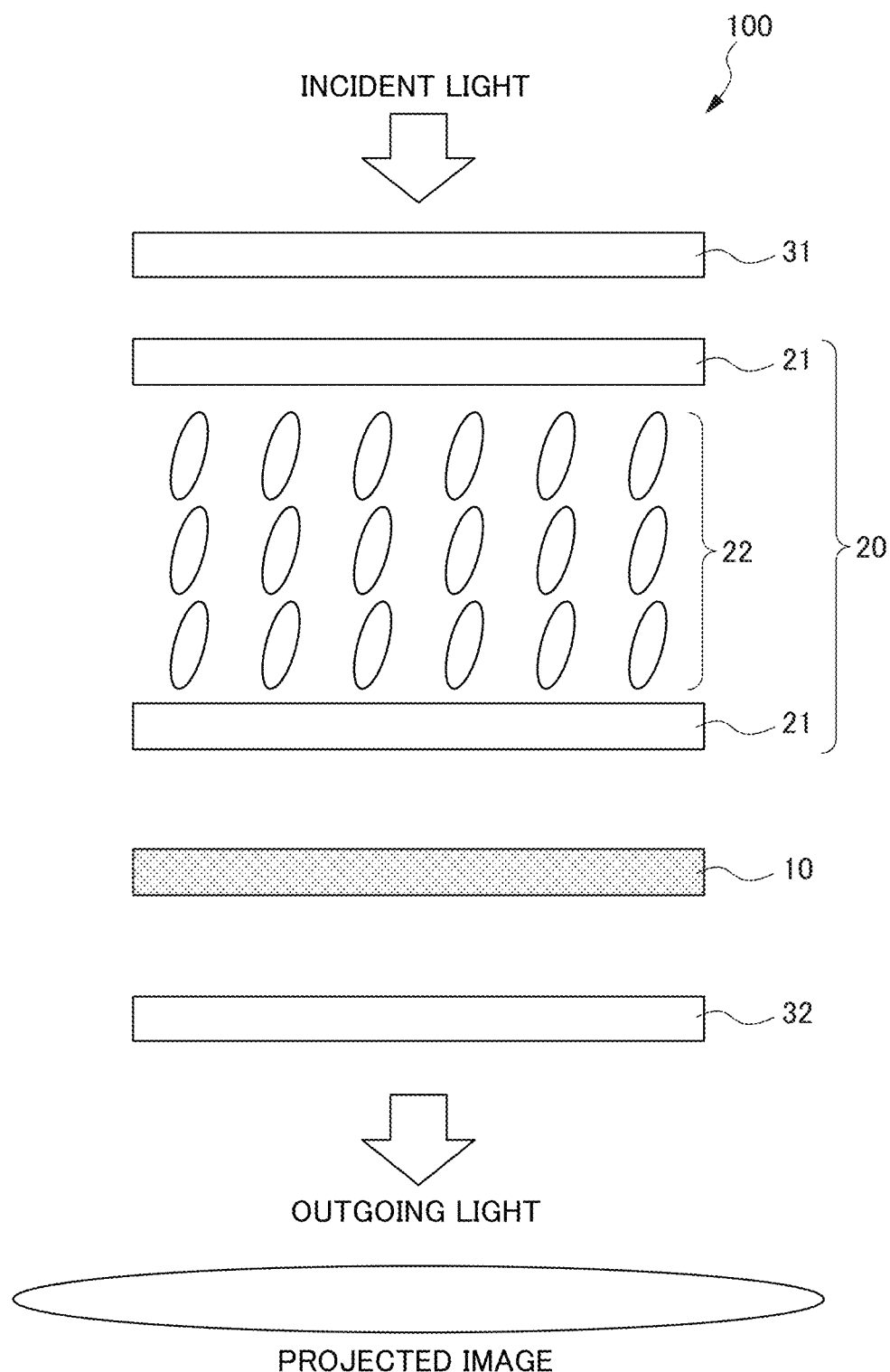
FIG. 12 is a schematic view that illustrates the configuration of a liquid crystal display device according to one embodiment of the present invention.

FIG. 12 is a schematic view that illustrates the configuration of a liquid crystal display device according to this embodiment. As illustrated in FIG. 12, the liquid crystal display device according to this embodiment includes a liquid crystal panel 20, a first polarizing plate 31, a second polarizing plate 32, and the phase difference compensation element 10 according to this embodiment.

The liquid crystal panel 20 is arranged between the first polarizing plate 31 and the second polarizing plate 32 and modulates incident light fluxes. The liquid crystal panel 20 includes two substrates 21 and 21 and a liquid crystal layer 22 arranged between the substrates 21 and 21.

As the substrates 21 and 21, glass substrates or the like are used. As the liquid crystal layer 22, a vertical alignment (VA) mode liquid crystal layer containing liquid crystal molecules having a pre-tilt with respect to a direction orthogonal to the principal face of the substrate 21 is used. Here, the VA mode represents a mode in which liquid crystal molecules arranged vertically (or at a pre-tilt) with respect to the substrate 21 are moved using a vertical electric field of the vertical direction.

The first polarizing plate 31 is arranged on the incident side of the liquid crystal panel 20. The second polarizing plate 32 is arranged on the outgoing side of the liquid crystal panel 20. The first polarizing plate 31 and the second polarizing plate 32 are preferably inorganic polarizing plates from the viewpoint of the durability. As the inorganic polarizing plate, for example, a plate in which inorganic fine particles (semiconductor or metal) having a size smaller than the use wavelength band and shape anisotropy are formed by using a vacuum film forming method such as sputtering or vacuum vapor deposition for a transparent substrate (for example, a glass substrate) that is transparent for the use wavelength band or the like is used.

The configuration of the phase difference compensation element 10 according to this embodiment is as described above, and this phase difference compensation element 10 is arranged on an optical path between the liquid crystal panel 20 and the second polarizing plate 32. It is preferable that the phase difference compensation element 10 is bonded to the liquid crystal panel 20 and the second polarizing plate 32 by using a bonding agent having high heat resistance.

In addition, a projection-type image display device according to this embodiment, which is not illustrated in the drawing, includes a light source, a projection optical system, and the liquid crystal display device 100.

The light source emits light. As the light source, for example, an extra-high pressure mercury lamp or the like is used. The projection optical system projects modulated light. As the projection optical system, for example, a projection lens that project modulated light onto a screen or the like is used. The liquid crystal display device 100 is arranged on an optical path between the light source and the projection optical system.

As illustrated in FIG. 10, in the optical system according to this embodiment, in the case of a projection-type liquid crystal panel of the vertical alignment type such as the VA mode liquid crystal layer described above, liquid crystal molecules in a no-voltage applied state are aligned to be tilted in a fixed direction by a pre-tilt angle with respect to the normal line direction of the substrate face. At this time, the liquid crystal panel 20 is arranged to be interposed between one pair of polarizing plates of which the projection axis directions oppose each other by 90 degrees.

The phase difference compensation element 10, the liquid crystal display device 100, and the projection-type image display device according to this embodiment as described above, the following effects are acquired. According to this embodiment, by arranging only one phase difference compensation element 10 in parallel on the outgoing side of the liquid crystal panel 20, the contrast of the liquid crystal display device 100 can be improved particularly without performing angle adjustment of the phase difference compensation element 10, and accordingly, a sufficient optical compensation effect can be acquired.

In more detail, by using the phase difference imparting and reflection preventing layer 12 that has a reflection prevention function and can control a phase difference of the obliquely incident light, a deviation of the phase difference of the obliquely incident light occurring in the liquid crystal panel 20 that cannot be completely compensated by the birefringence layer 13 can be corrected. In addition, by using in-plane birefringence according to the first birefringence layer 131, the second birefringence layer 132, and the third birefringence layer 133, disorder in the polarized light occurring according to the pre-tilt of liquid crystal molecules in the liquid crystal layer 22 can be corrected.

Furthermore, the phase difference compensation element 10 according to this embodiment is composed using an inorganic material, and accordingly, the durability such as heat resistance and light resistance is superior. In addition, since the type of substrate of the phase difference compensation element 10 is arbitrary, glass, quartz, or the like can be freely used according to the use of the phase difference compensation element 10. Furthermore, as in Patent Document 8 described above, even if there is a variation according to an angle difference in the vapor deposition direction between the center portion and the peripheral edge portion of the transparent substrate, which is an intrinsic problem in the conventional oblique vapor deposition, superior contrast is acquired, and there is an advantageous effect that there is no change in the characteristics of the phase difference compensation. In other words, in the process of producing the phase difference compensation element 10, a uniform phase difference compensation effect can be acquired at any position on the transparent substrate. Accordingly, the manufacturing cost can be reduced, and the lead time can be shortened, so that the phase difference compensation element 10 is optimal for a mass production process.

The present invention is not limited to the embodiment described above, and modifications or alterations in a range in which the object of the present invention can be achieved belong to the present invention.

EXAMPLES

Next, examples of the present invention will be described. However, the present invention is not limited to the examples.

Example 1

By alternately stacking $SiO_2$ and $Nb_2O_5$ by using the sputtering method on one face of a glass substrate as the transparent substrate, a phase difference imparting and reflection preventing film was formed. At this time, a film configuration in which a phase difference imparted to obliquely incident light tilted by 15 degrees with respect to the substrate normal line direction was 7 nm was used. A specific film configuration is illustrated in FIG. 13. As illustrated in FIG. 13, in this embodiment, a dielectric film configuration of 34 layers was employed.

Thereafter, on the other face of the glass substrate, by using a vapor deposition material acquired by adding $TiO_2$ to $Ta_2O_5$, oblique vapor deposition was performed with a vapor deposition source arranged at a position tilted by 70 degrees with respect to the substrate normal line direction, whereby the first birefringence layer was formed. Subsequently, by using the deposition material described above, after the glass substrate was rotated by a predetermined angle in the in-plane direction, oblique vapor deposition from the vapor deposition source described above was performed, whereby the second birefringence layer was formed on the first birefringence layer. In this way, the first birefringence layer in which the angle of the corner formed by the main axis of the refractive index anisotropy and the surface of the transparent substrate was not 90 degrees and the second birefringence layer in which the angle of the corner formed by the main axis of the refractive index anisotropy and the surface of the transparent substrate was not 90 degrees were formed.

Thereafter, oblique vapor deposition from the vapor deposition source described above is performed by using the deposition material between the position at this time and a position acquired by further rotating the glass substrate in the in-plane direction by 180 degrees being alternately switched for every film formation of 7 nm, whereby the third birefringence layer was formed on the second birefringence layer. In this way, the third birefringence layer was formed in which the angle of a corner formed by the main axis of the refractive index anisotropy and the surface of the transparent substrate is 0 degrees.

By using the vapor deposition method as described above, a birefringence layer was formed in which a segment B acquired when the main axis of the refractive index anisotropy of the second birefringence layer was projected on the surface of the glass substrate and a segment C acquired when the main axis of the refractive index anisotropy of the third birefringence layer was projected on the surface of the glass substrate are in parallel with each other. In addition, a birefringence layer was formed in which the angle of a corner formed by the segment B and the segment A acquired when the main axis of the refractive index anisotropy of the first birefringence layer was projected onto the surface of the glass substrate was the predetermined angle described above.

In this example, the film thicknesses of the first and second birefringence layers were set to 110 nm, and the film thickness of the third birefringence layer was set to 50 nm. In addition, the predetermined angle described above was changed in a stepped manner between 35 to 80 degrees in units of 5 degrees. In this way, birefringence layers were produced in which the angle of a corner formed by the segment A acquired when the main axis of the refractive index anisotropy of the first birefringence layer was projected onto the surface of the glass substrate and the segment B acquired when the main axis of the refractive index anisotropy of the second birefringence layer was projected onto the surface of the glass substrate was changed in a stepped manner between 35 to 80 degrees in units of 5 degrees.

After the vapor deposition, for de-colorization and evaporation of moisture sucked in columnar structures, annealing process was performed at 200° C. Thereafter, in order to improve the transmittance, only a reflection prevention film was formed on the birefringence layer by using the sputtering method. More specifically, as the reflection prevention film, a reflection prevention film formed by alternately stacking $SiO_2$ and $Nb_2O_5$ was formed.

By arranging each phase difference compensation element, the first polarizing plate, the second polarizing plate, and the liquid crystal panel of the vertically aligned transmission-type produced as above as illustrated in FIG. 12 to produce a liquid crystal display device, and the contrast of a projected image was measured. As the first polarizing plate and the second polarizing plate, main polarizing plates manufactured by Dexerials Corp. were used. As the liquid crystal panel, a liquid crystal panel into which a liquid crystal material of the vertical alignment type having positive anisotropy of the refractive index and negative dielectric anisotropy was injected was used. More specifically, a liquid crystal panel was used which included a liquid crystal layer including a relative refractive index $\Delta n$ and a liquid crystal layer d having a relation of $\Delta n \times d = 332$ nm and had a pre-tilt angle of 86 degrees controlled by an alignment film formed using an oblique deposition method. For the measurement of contrast, light was incident from the outside of the first polarizing plate, and luminance in a light transmitting state (a parallel aligned state of liquid crystal molecules) and luminance in a light blocking state (a vertically aligned state of liquid crystal molecules) were measured, and, by calculating a ratio thereof, the contrast was calculated.

Figure 14:
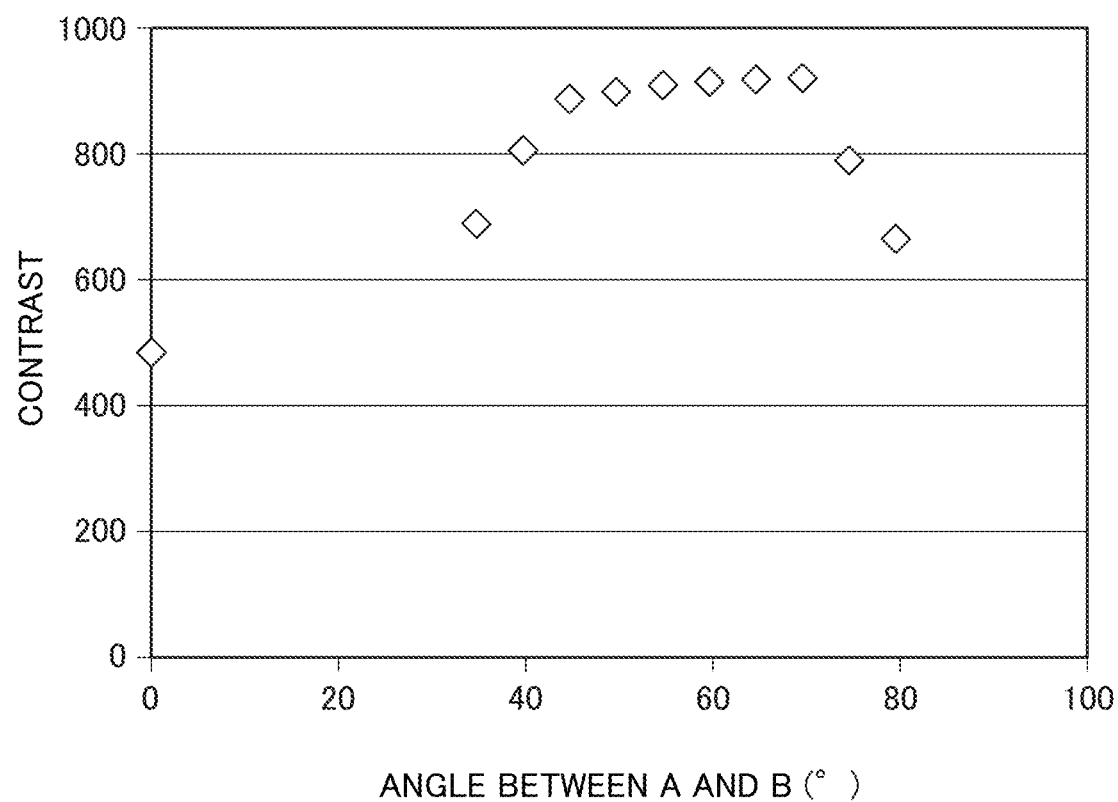
FIG. 14 is a diagram that illustrates a relation between the angle of a corner formed by a segment A and a segment B and contrast.

A result of the calculation of the contrast is illustrated in FIG. 14. FIG. 14 is a diagram that illustrates a relation between the angle of a corner formed by the segment A and the segment B and contrast. In FIG. 14, a plot for the angle of the corner formed by the segment A and the segment B to be 0 degrees represents the contrast of a case where no phase difference compensation element is present. From FIG. 14, according to the optical system of this example, it was checked that, in a case where the angle of the corner formed by the segment A and the segment B is 45 degrees or more and 70 degrees or less, contrast that is about twice that of a case where no phase difference compensation element is present can be acquired.

Figure 15:
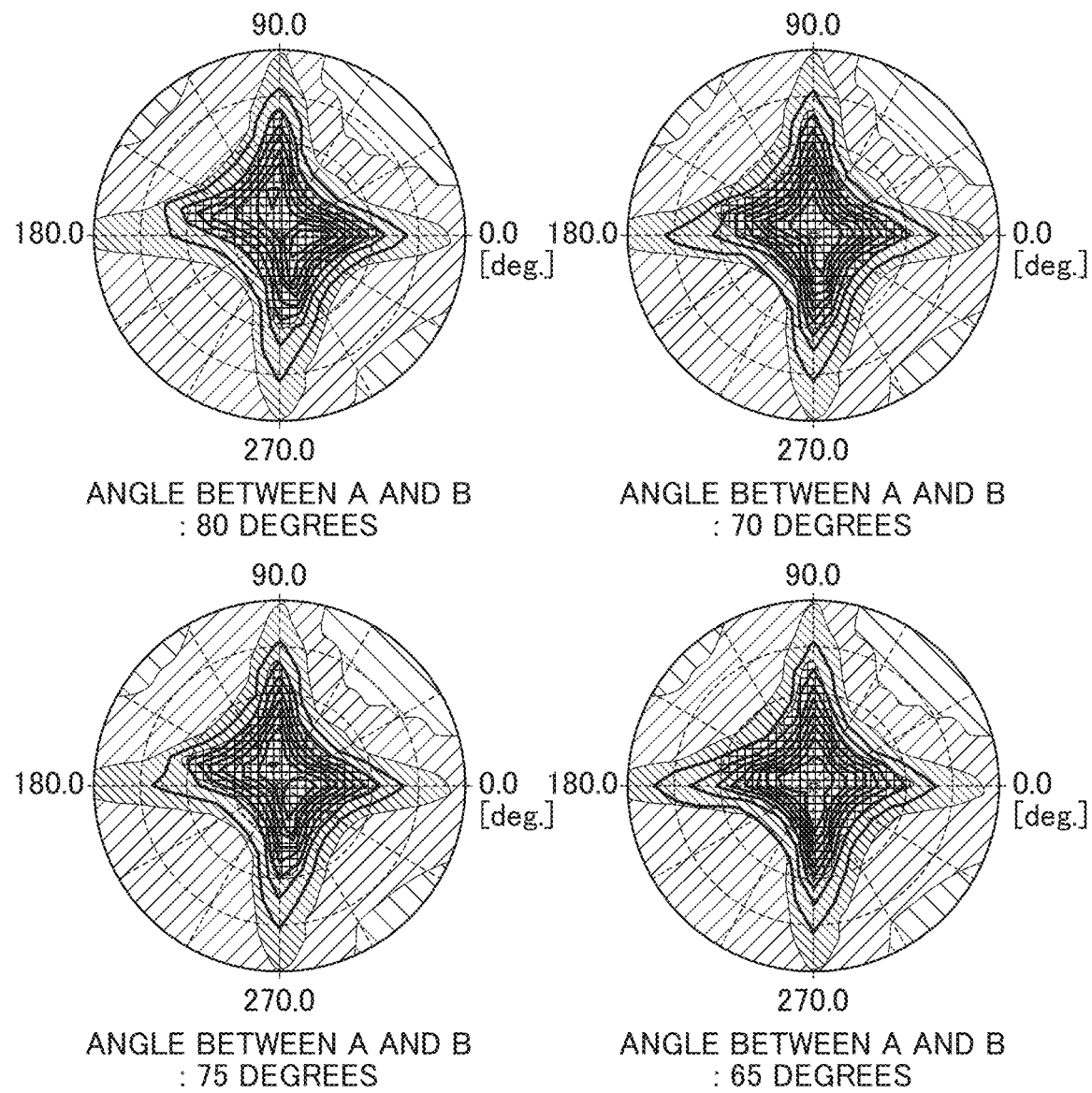
FIG. 15 is a diagram that illustrates contour maps of contrast of a projected image when the angle of the corner formed by the segment A and the segment B according to Example 1 is 65 to 80 degrees.
Figure 16:
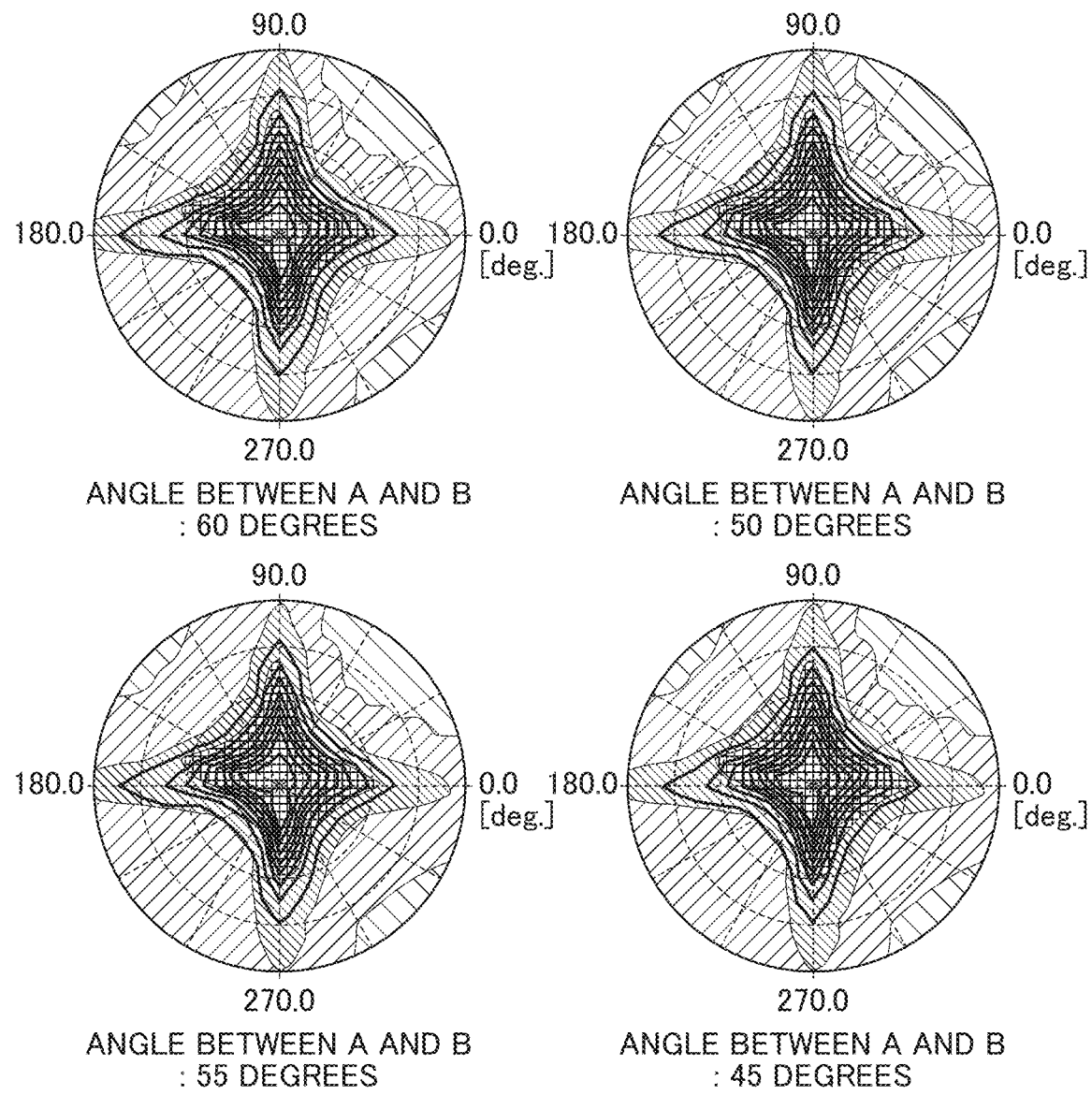
FIG. 16 is a diagram that illustrates contour maps of contrast of a projected image when the angle of the corner formed the segment A and the segment B according to Example 1 is 45 to 60 degrees.
Figure 17:
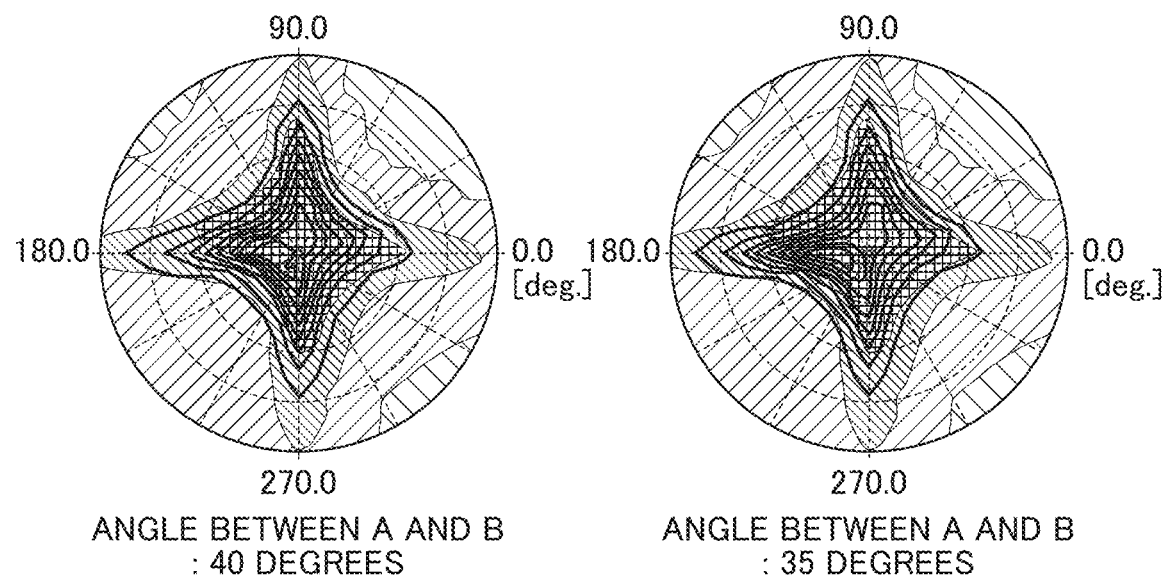
FIG. 17 is a diagram that illustrates contour maps of contrast of a projected image when the angle of a corner formed by the segment A and the segment B according to Example 1 is 35 to 40 degrees.

In this example, contour maps of the contrast of a projected image when the angle (also referred to an angle between A and B) of the corner formed by the segment A and the segment B is 35 degrees or more and 80 degrees or less are illustrated in FIGS. 15 to 17. In the contour maps illustrated in FIGS. 15 to 17, a darker area to which hatching is applied represents higher contrast. From FIGS. 15 to 17, it can be understood that, in a case where the angle of the corner formed by the segment A and the segment B is 45 degrees or more and 70 degrees or less, an area having highest contrast is arranged to be concentrated at the center of the contour map. On the other hand, it can be understood that, in a case where the angle of the corner formed by the segment A and the segment B is less than 40 degrees or 75 degrees or more, a plurality of areas having high contrast are distributed to deviate from the center of the contour map. From this result, it was checked that the angle of the corner formed by the segment A and the segment B is preferably 45 degrees or more and 70 degrees or less.

As described above, according to the present invention, it has been checked that, even in a case where there is an angle distribution for the in-plane angle distribution of the transparent substrate that is an intrinsic problem of the oblique vapor deposition as illustrated in Patent Document 8 described above, an equivalent effect of phase difference compensation can be acquired at any position on the transparent substrate. Accordingly, through a simple mass production process like cutting-out of the transparent substrate into lattice shapes, a phase difference compensation plate having a uniform compensation effect can be acquired, and thus, it can be regarded that the present invention has an advantageous effect over conventional technologies.

Example 2

By alternately stacking $SiO_2$ and $Nb_2O_5$ by using the sputtering method on one face of a glass substrate as the transparent substrate, a phase difference imparting and reflection preventing film was formed. At this time, a film configuration in which a phase difference imparted to obliquely incident light tilted by 15 degrees with respect to the substrate normal line direction was 7 nm was used. A specific film configuration is similar to that of Example 1.

Thereafter, on the other face of the glass substrate, by using a vapor deposition material acquired by adding $TiO_2$ to $Ta_2O_5$, oblique vapor deposition was performed with a vapor deposition source arranged at a position tilted by 70 degrees with respect to the substrate normal line direction, whereby the first birefringence layer was formed. Subsequently, by using the deposition material, after the glass substrate was rotated by 67 degrees in the in-plane direction, oblique vapor deposition from the vapor deposition source described above was performed, whereby the second birefringence layer was formed on the first birefringence layer. In this way, the first birefringence layer in which the angle of the corner formed by the main axis of the refractive index anisotropy and the surface of the transparent substrate was not 90 degrees and the second birefringence layer in which the angle of the corner formed by the main axis of the refractive index anisotropy and the surface of the transparent substrate was not 90 degrees were formed.

Thereafter, oblique vapor deposition from the vapor deposition source described above is performed by using the deposition material between the position at this time and a position acquired by further rotating the glass substrate in the in-plane direction by 180 degrees being alternately switched for every film formation of 7 nm, whereby the third birefringence layer was formed on the second birefringence layer. In this way, the third birefringence layer was formed in which the angle of a corner formed by the main axis of the refractive index anisotropy and the surface of the transparent substrate is 0 degrees.

By using the vapor deposition method as described above, a birefringence layer was formed in which a segment B acquired when the main axis of the refractive index anisotropy of the second birefringence layer was projected on the surface of the glass substrate and a segment C acquired when the main axis of the refractive index anisotropy of the third birefringence layer was projected on the surface of the glass substrate are in parallel with each other. In addition, a birefringence layer was formed in which the angle of a corner formed by the segment B and the segment C and the segment A acquired when the main axis of the refractive index anisotropy of the first birefringence layer was projected onto the surface of the glass substrate was 67 degrees.

After the vapor deposition, for de-colonization and evaporation of moisture sucked in columnar structures, annealing process was performed at 200° C. Thereafter, in order to improve the transmittance, only a reflection prevention film was formed on the birefringence layer by using the sputtering method. More specifically, as the reflection prevention film, a reflection prevention film formed by alternately stacking $SiO_2$ and $Nb_2O_5$ was formed.

In this example, the film thicknesses of the first birefringence layer and the second birefringence layer were set to be the same, and the film thicknesses of the first and second birefringence layers were changed in a stepped manner between 30 to 250 nm in units of 20 nm for the production of phase difference compensation elements. In addition, at the same time, the film thickness of the third birefringence layer was changed in a stepped manner between 30 to 90 nm in units of 20 nm for the production of phase difference compensation elements.

By using the phase difference compensation elements produced as described above, liquid crystal display devices were produced by performing an operation similar to that of Example 1. Thereafter, by using the produced liquid crystal display devices, similarly to Example 1, the contrast of projected images was measured.

Figure 18:
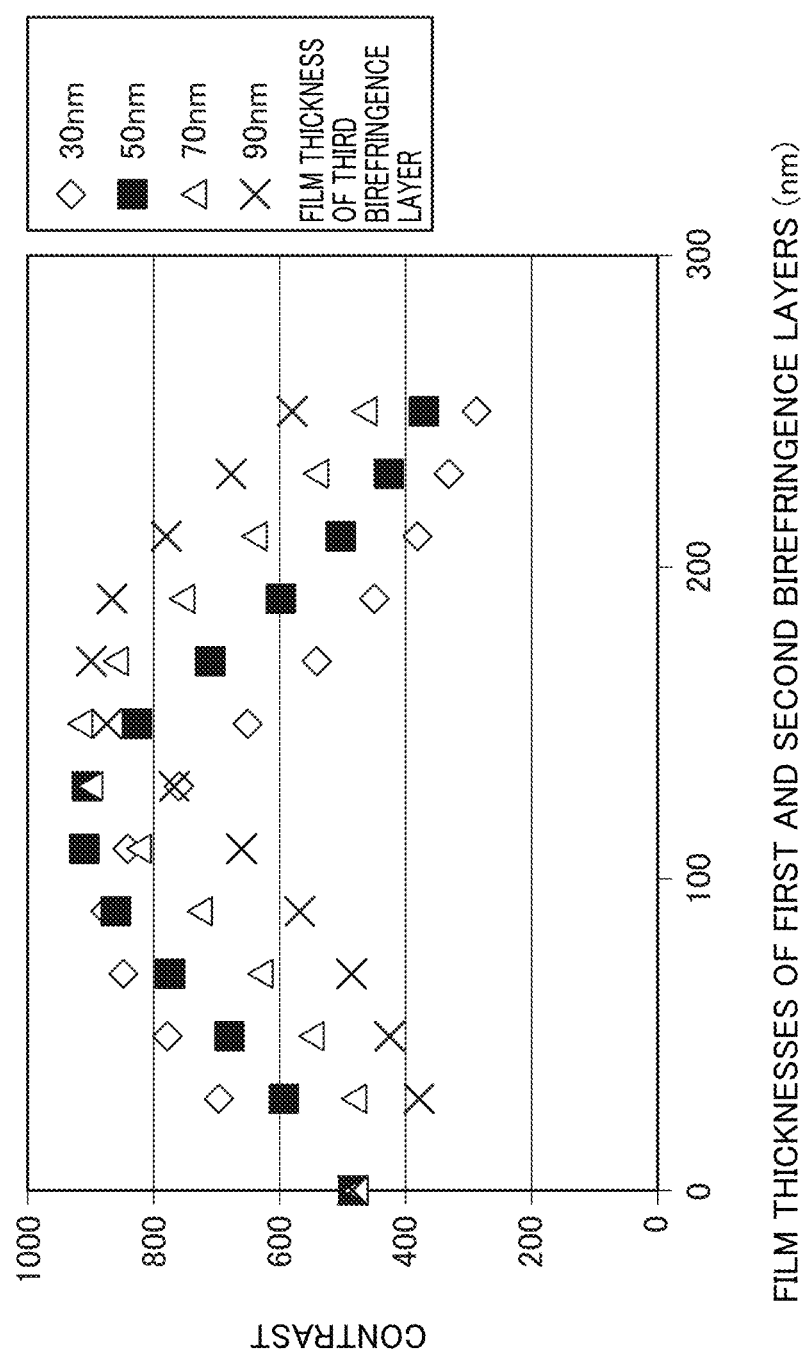
FIG. 18 is a diagram that illustrates a relation between the thicknesses of the first and second birefringence layers and contrast when the thickness of the third birefringence layer according to Example 2 is changed.

A result of the calculation of the contrast is illustrated in FIG. 18. FIG. 18 is a diagram that illustrates a relation between the thicknesses of the first and second birefringence layers and contrast when the thickness of the third birefringence layer according to Example 2 is changed. In FIG. 18, a plot for the film thicknesses of the first and second birefringence layers to be 0 nm represents contrast of a case where no phase difference compensation element is present. From FIG. 18, according to the optical system of this example, it was checked that, in a case where a difference between the film thicknesses of the first and second birefringence layers and the film thickness of the third birefringence layer is 60 nm or more and 80 nm or less, regardless of the film thickness of the third birefringence layer, contrast that is about twice that of a case where no phase difference compensation element is present can be acquired.

Comparative Example 1

As Comparative Example 1, for a phase difference compensation element having no third birefringence layer, the contrast was evaluated. First, by alternately stacking $SiO_2$ and $Nb_2O_5$ by using the sputtering method on one face of a glass substrate as the transparent substrate, a phase difference imparting and reflection preventing film was formed. At this time, a film configuration in which a phase difference imparted to obliquely incident light tilted by 15 degrees with respect to the substrate normal line direction was 7 nm was used. More specifically, a specific film configuration that is the same as that of Example 1 was employed.

Thereafter, on the other face of the glass substrate, by using a vapor deposition material acquired by adding $TiO_2$ to $Ta_2O_5$, oblique vapor deposition was performed with a vapor deposition source arranged at a position tilted by 70 degrees with respect to the substrate normal line direction, whereby the first birefringence layer was formed. Subsequently, by using the deposition material, after the glass substrate was rotated by 67 degrees in the in-plane direction, oblique vapor deposition from the vapor deposition source described above was performed, whereby the second birefringence layer was formed on the first birefringence layer. In this way, the first birefringence layer in which the angle of the corner formed by the main axis of the refractive index anisotropy and the surface of the transparent substrate was not 90 degrees and the second birefringence layer in which the angle of the corner formed by the main axis of the refractive index anisotropy and the surface of the transparent substrate was not 90 degrees were formed.

By using the vapor deposition method as described above, a birefringence layer was formed in which the angle of a corner formed by a segment A acquired when the main axis of the refractive index anisotropy of the first birefringence layer was projected on the surface of the glass substrate and a segment B acquired when the main axis of the refractive index anisotropy of the second birefringence layer was projected on the surface of the glass substrate was 67 degrees. In addition, in this comparative example, the film thicknesses of the first and second birefringence layers were set to 110 nm.

After the vapor deposition, for de-colorization and evaporation of moisture sucked in columnar structures, annealing process was performed at 200° C. Thereafter, in order to improve the transmittance, only a reflection prevention film was formed on the birefringence layer by using the sputtering method. More specifically, as the reflection prevention film, a reflection prevention film formed by alternately stacking $SiO_2$ and $Nb_2O_5$ was formed.

By using the phase difference compensation element produced as described above, a liquid crystal display device was produced by performing an operation similar to that of Example 1. Thereafter, by using the produced liquid crystal display device, similarly to Example 1, the contrast of a projected image was measured.

Figure 19:
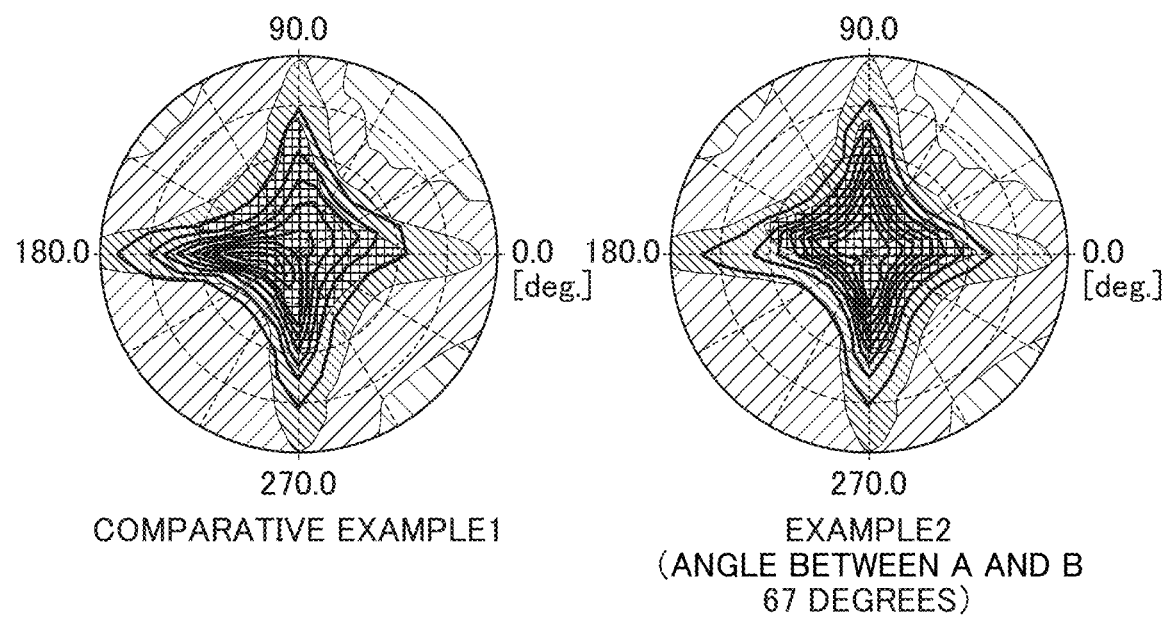
FIG. 19 is a diagram that illustrates contour maps of the contrast of a projected image according to Comparative Example 1.

A contour map of the contrast of a projected image according to Comparative Example 1 is illustrated in FIG. 19. For a comparison, a contour map acquired when the angle between A and B is set to 67 degrees in Example 2 (a state in which the third birefringence layer is included) is illustrated as well. From FIG. 19, it can be understood that, in the phase difference compensation element having no third birefringence layer, a plurality of high contrast areas are distributed to deviate from the center of the contour map. Accordingly, from the viewpoint of the improvement of the contrast, it has been checked that the inclusion of the third birefringence layer is important.

Comparative Example 2

As Comparative Example 2, for a phase difference compensation element having no third birefringence layer, changes in the contrast when the angle of the corner formed by the segment A and the segment B is changed were evaluated. First, by alternately stacking $SiO_2$ and $Nb_2O_5$ by using the sputtering method on one face of a glass substrate as the transparent substrate, a phase difference imparting and reflection preventing film was formed. At this time, a film configuration in which a phase difference imparted to obliquely incident light tilted by 15 degrees with respect to the substrate normal line direction was 7 nm was used. More specifically, a specific film configuration that is the same as that of Example 1 was employed.

Thereafter, on the other face of the glass substrate, by using a vapor deposition material acquired by adding $TiO_2$ to $Ta_2O_5$, oblique vapor deposition was performed with a vapor deposition source arranged at a position tilted by 70 degrees with respect to the substrate normal line direction, whereby the first birefringence layer was formed. Subsequently, after the glass substrate was rotated by a predetermined angle in the in-plane direction, oblique vapor deposition from the vapor deposition source described above was performed, whereby the second birefringence layer was formed on the first birefringence layer. In this way, the first birefringence layer in which the angle of the corner formed by the main axis of the refractive index anisotropy and the surface of the transparent substrate was not 90 degrees and the second birefringence layer in which the angle of the corner formed by the main axis of the refractive index anisotropy and the surface of the transparent substrate was not 90 degrees were formed.

At this time, the film thicknesses of the first and second birefringence layers were set to 110 nm. In this way, birefringence layers were produced in which the angle of a corner formed by the segment A acquired when the main axis of the refractive index anisotropy of the first birefringence layer was projected onto the surface of the glass substrate and the segment B acquired when the main axis of the refractive index anisotropy of the second birefringence layer was projected onto the surface of the glass substrate was changed in a stepped manner between 55 to 95 degrees in units of 5 degrees.

After the vapor deposition, for de-colorization and evaporation of moisture sucked in columnar structures, annealing process was performed at 200° C. Thereafter, in order to improve the transmittance, only a reflection prevention film was formed on the birefringence layer by using the sputtering method.

By using the phase difference compensation element produced as described above, a liquid crystal display device was produced by performing an operation similar to that of Example 1. Thereafter, by using the produced liquid crystal display device, similarly to Example 1, the contrast of a projected image was measured.

Figure 20:
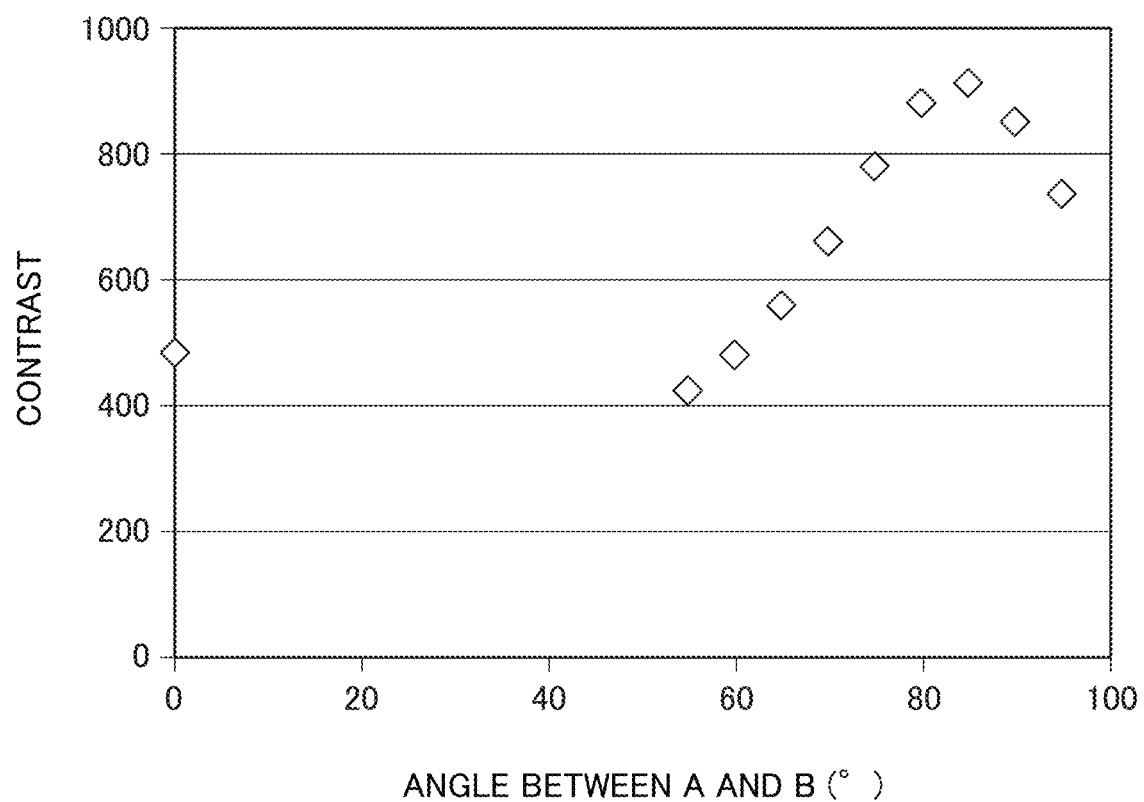
FIG. 20 is a diagram that illustrates a relation between the angle of the corner formed by a segment A and a segment B and contrast according to Comparative Example 2.

A result of the calculation of the contrast is illustrated in FIG. 20. FIG. 20 is a diagram that illustrates a relation between the angle of a corner formed by the segment A and the segment B and contrast in Comparative Example 2. In FIG. 20, a plot for the angle of the corner formed by the segment A and the segment B to be 0 degrees represents the contrast of a case where no phase difference compensation element is present. From FIG. 20, it can be understood that, in the optical system of Comparative Example 2 having no third birefringence layer, in a case where the angle of the corner formed by the segment A and the segment B is in the range of 80 to 90 degrees, contrast that is about twice that of a case where no phase difference compensation element is present can be acquired. However, the angle range in which high contrast can be acquired is disposed to be much narrower than that of the case of Example 1 having the third birefringence layer. From this result, it has been checked that, by including the third birefringence layer, high contrast can be acquired in a wider angle range of the corner formed by the segment A and the segment B.

Figure 21:
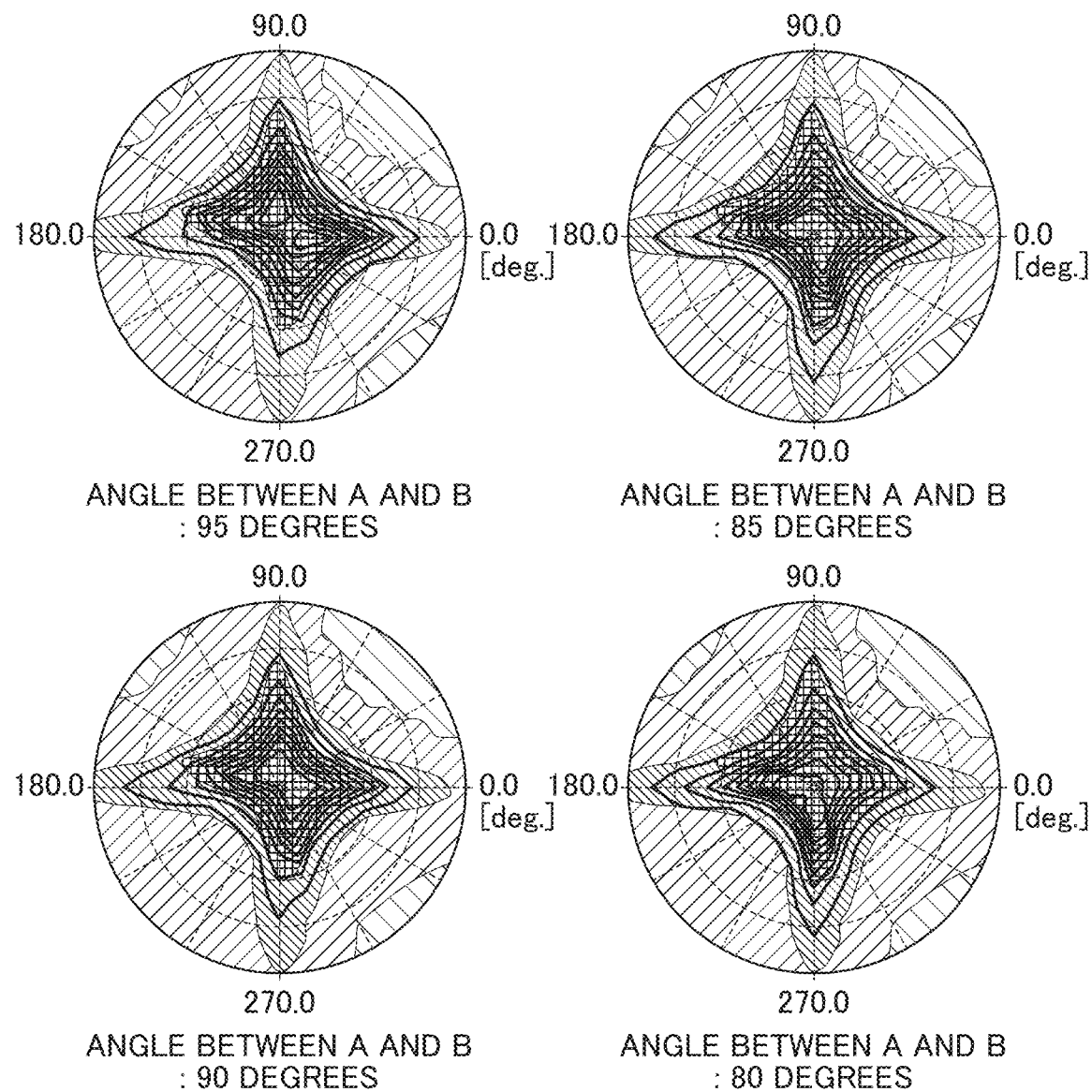
FIG. 21 is a diagram that illustrates contour maps of contrast of a projected image when the angle of the corner formed by the segment A and the segment B according to Comparative Example 2 is 80 to 95 degrees.
Figure 22:
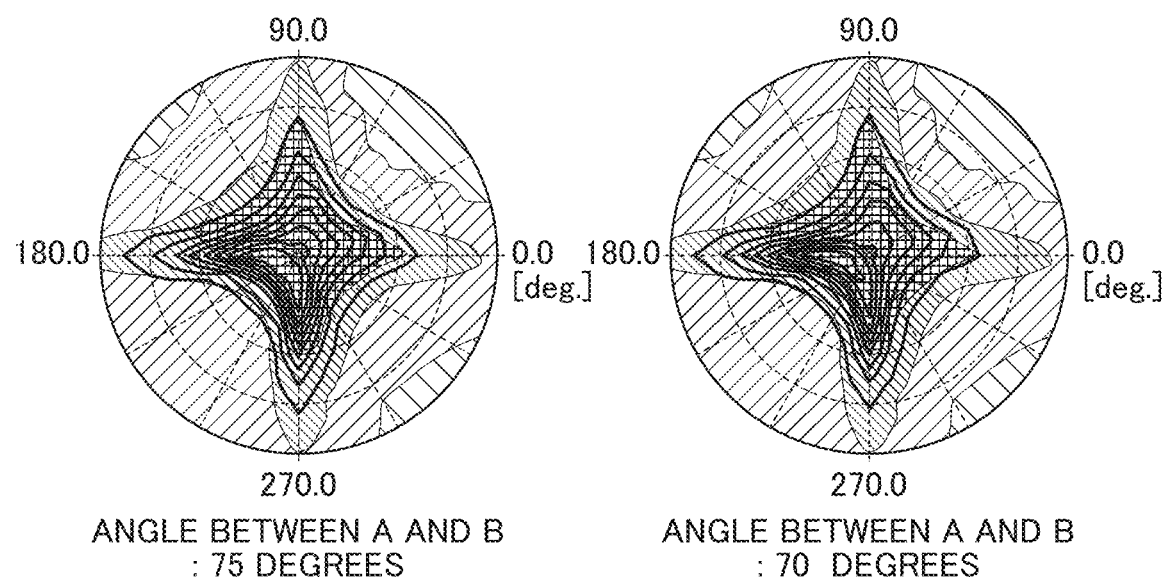
FIG. 22 is a diagram that illustrates contour maps of contrast of a projected image when the angle of the corner formed by the segment A and the segment B according to Comparative Example 2 is 70 to 75 degrees.

In Comparative Example 2, contour maps of the contrast of a projected image when the angle of the corner formed by the segment A and the segment B is 70 degrees or more and 95 degrees or less are illustrated in FIGS. 21 and 22. In these contour maps, angles at which highest contrast area is arranged at the center are only in the range of 10 degrees from 80 degrees to 90 degrees, and it has been checked that the angle range that is optimal for the improvement of contrast is narrower than that of the result (45 degrees or more and 70 degrees or less) of Example 1. As above, it has been checked that, in a case where no third birefringence layer is present, there are differences in the optical characteristics inside the plane of the transparent substrate in accordance with the angle distribution of the transparent substrate, which is an intrinsic problem of an oblique vapor deposition film.

EXPLANATION OF REFERENCE NUMERALS

10: Phase difference compensation element
11: Transparent substrate
12: Phase difference imparting and reflection preventing layer
13: Birefringence layer
14: Protection layer
20: Liquid crystal panel
21: Substrate
22: Liquid crystal layer
31: First polarizing plate
32: Second polarizing plate
100: Liquid crystal display device
121: First dielectric film
122: Second dielectric film
131: First birefringence layer
132: Second birefringence layer
133: Third birefringence layer
S: Substrate normal line

What is claimed is:

1. A phase difference compensation element comprising:
    a transparent substrate;
    a phase difference imparting and reflection preventing layer that is formed by optical multiple layers, imparts a phase difference to obliquely incident light included in incident light, and prevents reflection of the incident light;
    a first birefringence layer that includes a first optical anisotropic inorganic material in which a first angle formed by a main axis of refractive index anisotropy of the first optical anisotropic inorganic material and a surface of the transparent substrate is not 90 degrees;
    a second birefringence layer that includes a second optical anisotropic inorganic material in which a second angle formed by a main axis of refractive index anisotropy of the second optical anisotropic inorganic material and the surface of the transparent substrate is not 90 degrees; and
    a third birefringence layer that includes a third optical anisotropic inorganic material in which a third angle formed by a main axis of refractive index anisotropy of the third optical anisotropic inorganic material and the surface of the transparent substrate is 0 degrees a fourth angle formed by the first segment and the second segment is 45 degrees or more and 70 degrees or less" that is projected onto the surface of the transparent substrate, a first segment is acquired when the main axis of the refractive index anisotropy of the first optical anisotropic inorganic material is projected onto the surface of the transparent substrate, a second segment is acquired when the main axis of the refractive index anisotropy of the second optical anisotropic inorganic material is projected onto the surface of the transparent substrate, a third segment is acquired when the main axis of the refractive index anisotropy of the third optical anisotropic inorganic material is projected onto the surface of the transparent substrate.

2. The phase difference compensation element according to claim 1, wherein one or both of the first birefringence layer and the second birefringence layer are formed from an oblique deposition film.

3. The phase difference compensation element according to claim 1, wherein the third birefringence layer is formed from stacked films in which oblique deposition films in directions opposing each other at 180 degrees are alternately stacked.

4. The phase difference compensation element according to claim 1, wherein at least one of the first optical anisotropic inorganic material, the second optical anisotropic inorganic material, and the third optical anisotropic inorganic material is an oxide containing at least one type selected from the group consisting of Si, Nb, Zr, Ti, La, Ta, and Al.

5. The phase difference compensation element according to claim 1, wherein a difference between a phase difference of the first birefringence layer and a phase difference of the second birefringence layer is less than 10 nm.

6. The phase difference compensation element according to claim 1, wherein a phase difference of the first birefringence layer and a phase difference of the second birefringence layer are approximately the same.

7. The phase difference compensation element according to claim 1, wherein a difference between a film thickness of the first birefringence layer or a film thickness of the second birefringence layer and a film thickness of the third birefringence layer is 60 nm or more and 80 nm or less.

8. The phase difference compensation element according to claim 1, wherein the third birefringence layer is formed from a high-refractive index dielectric material and has a comb-tooth structure.

9. The phase difference compensation element according to claim 1, wherein the third birefringence layer is formed from a high-refractive index dielectric material and a low-refractive index dielectric material.

10. A liquid crystal display device comprising:
a liquid crystal panel that includes a VA (vertical alignment)-mode liquid crystal layer containing liquid crystal molecules having a pre-tilt with respect to a direction orthogonal to a principal face of the substrate and modulates incident light fluxes;
a first polarizing plate that is arranged on an incident side of a liquid crystal panel;
a second polarizing plate that is arranged on an outgoing side of the liquid crystal panel; and
the phase difference compensation element according to claim 1 that is arranged on an optical path between the liquid crystal panel and the second polarizing plate.

11. A projection-type image display device comprising:
a light source that emits light;
a projection optical system that projects modulated light; and
the liquid crystal display device according to claim 10 that is arranged on an optical path between the light source and the projection optical system.

* * * * *